United States Patent
Ichii

(10) Patent No.: US 7,586,661 B2
(45) Date of Patent: Sep. 8, 2009

(54) OPTICAL SCANNING DEVICE AND IMAGE FORMING APPARATUS

(75) Inventor: Daisuke Ichii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 11/771,275

(22) Filed: Jun. 29, 2007

(65) Prior Publication Data

US 2008/0247021 A1    Oct. 9, 2008

(30) Foreign Application Priority Data

Jul. 3, 2006   (JP) .............................. 2006-182956
Apr. 25, 2007  (JP) .............................. 2007-115133

(51) Int. Cl.
G02B 26/08    (2006.01)

(52) U.S. Cl. .................................. 359/205.1

(58) Field of Classification Search .......... 359/204–208
See application file for complete search history.

(56) References Cited

U.S. PATENT DOCUMENTS 7,218,432 B2    5/2007   Ichii et al.

2006/0131491 A1 *  6/2006   Shimomura et al. ......... 250/234

FOREIGN PATENT DOCUMENTS

| JP | 2002-287062 | 10/2002 |
|----|-------------|---------|
| JP | 3397638     | 2/2003  |
| JP | 2003-241130 | 8/2003  |

OTHER PUBLICATIONS

U.S. Appl. No. 11/771,275, filed Jun. 29, 2007, Ichii.
U.S. Appl. No. 12/186,808, filed Aug. 6, 2008, Watanabe, et al.
U.S. Appl. No. 12/190,182, filed Aug. 12, 2008, Ichii et al.

* cited by examiner

*Primary Examiner*—Euncha P Cherry
(74) *Attorney, Agent, or Firm*—Oblon, Spivak, McClelland, Maier & Neustadt, P.C.

(57) ABSTRACT

A coupling optical system that includes a coupling lens, a linear-image forming lens, and an aperture couples light beams emitted from a light source to form a light flux. A deflector scans the light flux in a main scanning direction to form an image as a scanning line on a surface to be scanned through first and second scanning lenses. While an image is being formed on an image plane, the image plane is moved in a direction perpendicular to the main scanning direction. The linear-image forming lens has a diffractive optical surface capable of collecting light in a sub-scanning direction. The temperature dependence $d\lambda/dT$ of wavelength of the light source satisfies $d\lambda/dT<0.15$.

18 Claims, 21 Drawing Sheets

- - - L1R1  ENTRANCE SURFACE OF FIRST SCANNING LENS
— L1R2  EXIT SURFACE OF FIRST SCANNING LENS

- - - L2R1  ENTRANCE SURFACE OF SECOND SCANNING LENS
— L2R2  EXIT SURFACE OF SECOND SCANNING LENS

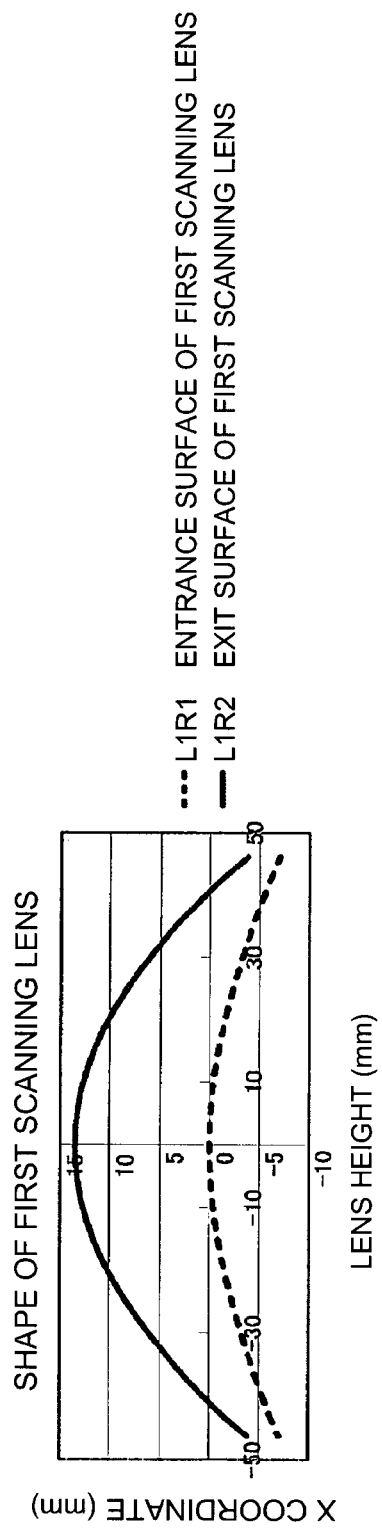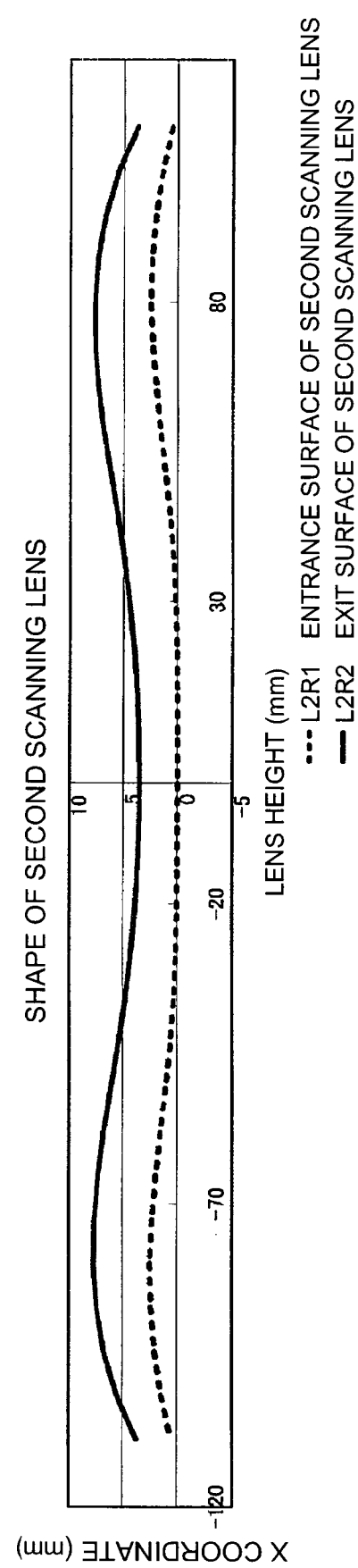

DIFFERENCE $\Delta\beta$ IN LATERAL MAGNIFICATION IN SUB-SCANNING DIRECTION $\Delta\beta$ (%)

BEAM-SPOT DIAMETER IN MAIN SCANNING DIRECTION (Am=2)

BEAM-SPOT DIAMETER IN SUB-SCANNING DIRECTION (As=2)

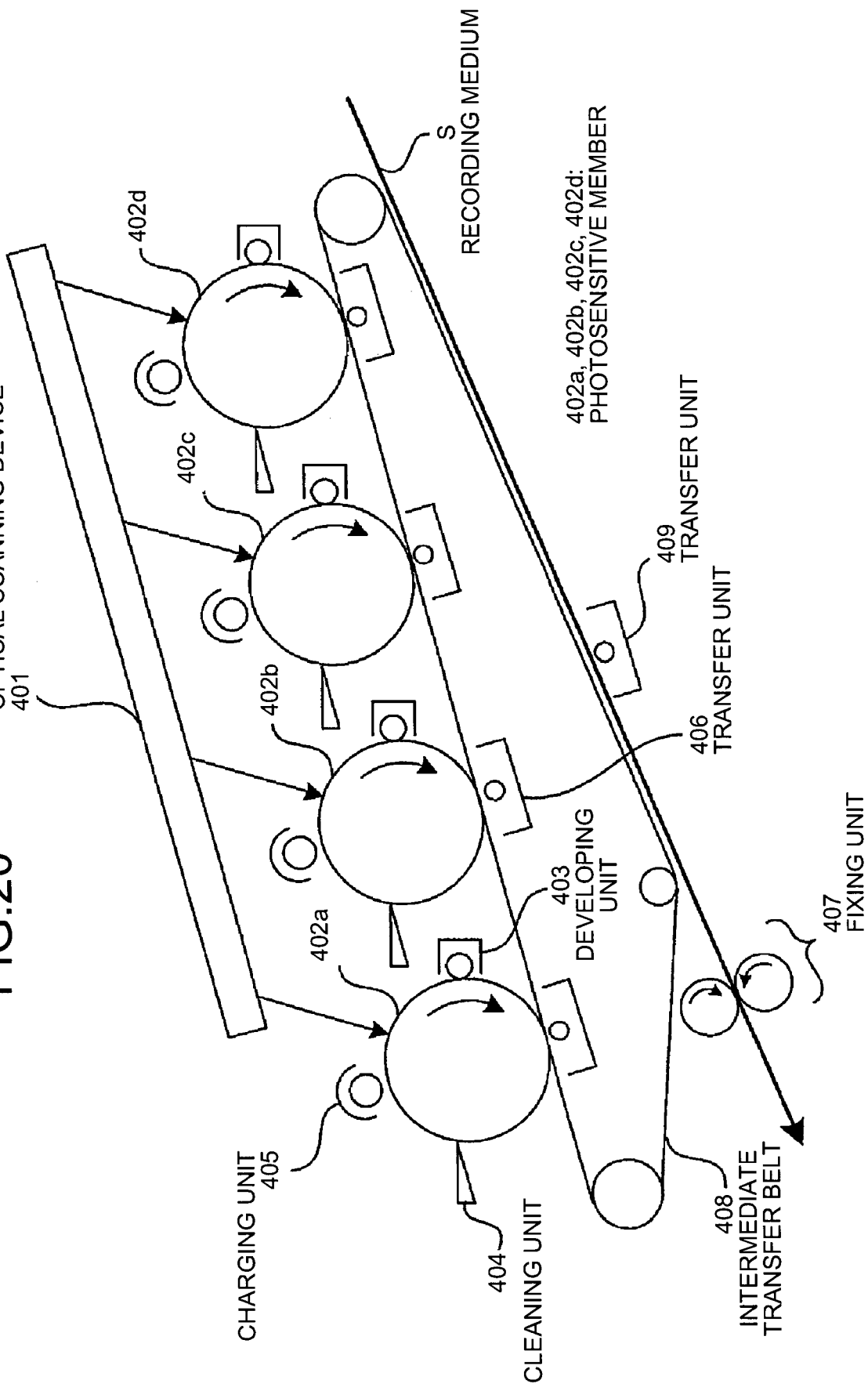

OPTICAL SCANNING DEVICE AND IMAGE FORMING APPARATUS

CROSS-REFERENCE TO RELATED APPLICATIONS

The present application claims priority to and incorporates by reference the entire contents of Japanese priority documents, 2006-182956 filed in Japan on Jul. 3, 2006 and 2007-115133 filed in Japan on Apr. 25, 2007.

BACKGROUND OF THE INVENTION

1. Field of the Invention

The present invention relates to an optical scanning device and an image forming apparatus.

2. Description of the Related Art

In recent years, high image quality, speed-up, and cost reduction are increasingly demanded of electrophotographic image forming apparatuses, such as laser printers and copiers. As for the high image quality in particular, stable high-quality image formation is required even when environment such as temperature and humidity changes. Technologies for providing an optical element with a variety of functions have been proposed to meet these demands. One of the technologies uses diffractive optical effect. Such a technology using diffractive optical effect is explained below.

A significant matter in properties of an optical scanning device about the stability of image quality is a change of a beam waist position (change of a focus position) due to temperature change. When the device is placed in environment which changes and if the temperature actually changes, this temperature change causes an optical element to thermally expand and a refractive index thereof to change. The position of the beam waist thereby deviates from a surface to be scanned, and the size of a light spot on the surface changes. If the size of the light spot increases or varies, the resolution of an image is reduced and image quality is degraded due to, for example, degradation of graininess, which interferes with stable image formation.

Hence, an optical system has been proposed in which an optical element with diffraction effect performs part of imaging function. The change in the temperature causes the refractive index of the optical element or a lens particularly made of resin such as plastic to change, and causes the lens to thermally expand, which leads to change of the beam waist position. At the same time, an oscillation wavelength of a light source varies. A focal length of a diffractive optical element is caused to vary due to the wavelength variation. It is known that the direction of the variation is opposite to that of the change in the focal length of the lens.

As a technology using this property, for example, Japanese Patent No. 3397638 discloses an optical system in which a scanning optical system includes a diffraction portion and a refraction portion. More specifically, in the optical system, by defining respective powers of the both portions, the change of the focus position which is variation of aberration is canceled out and corrected by a change in power of the refraction portion due to temperature change and by a change in power of the diffraction portion when the wavelength of the light source changes due to the temperature change. Thus, the change of the focus position in a sub-scanning direction can be prevented.

Japanese Patent Application Laid-Open No. 2002-287062 discloses a laser scanning device in which a light-source optical system collects light beams emitted from a light source near a deflecting surface in a sub-scanning direction. More specifically, the light-source optical system includes one optical element having a diffractive optical surface and a reflecting surface without a rotational symmetric axis.

As another method of using the diffraction effect, there is a method provided for deflection in addition to the method of causing the optical element to have the imaging function. For example, Japanese Patent Application Laid-Open No. 2003-241130 discloses an optical scanning device that diffracts light beams using a liquid-crystal deflecting element, deflects it in a sub-scanning direction and/or a main scanning direction, and correctively adjusts the position of a light spot. This optical scanning device including a ghost-light removal unit is proposed. The ghost-light removal unit blocks ghost light having occurred, to solve the problem in which there occurs another order of diffracted light being possibly the ghost light, other than normal diffracted light.

In the conventional technologies, however, when the diffractive optical element is used, a problem on decrease in diffraction efficiency which does not occur in a refractive optical element is not solved. As for the diffractive optical element, when the wavelength of the light source varies, the focal length changes, which also causes the diffraction efficiency of the diffractive optical element highly sensitive to the wavelength, to change. The diffraction efficiency or light-use efficiency decreases by deviation of wavelength from design wavelength of the element, and the image quality deteriorates caused by the change of light amount. As described in Japanese Patent Application Laid-Open No. 2003-241130, another order of diffracted light becomes stray light which is not used for desired optical scanning, and when this diffracted light occurs and reaches a photosensitive member, the image quality is degraded. To prevent the degradation, a shielding element or the like needs to be newly provided, which causes an increase in the number of components. This increase causes cost to increase and influence to be exerted on layout of the device, which results in upsizing of the device.

SUMMARY OF THE INVENTION

It is an object of the present invention to at least partially solve the problems in the conventional technology.

According to an aspect of the present invention, an optical scanning device includes a light source that emits light beams, a deflector that deflects the light beams in a main scanning direction, a coupling optical system that guides the light beams from the light source to the deflector, and a scanning optical system that scans the light beams on a target surface to form an image. The coupling optical system includes at least one diffractive optical surface. When linearly approximated, temperature dependence $d\lambda/dT$ of wavelength of the light source satisfies $d\lambda/dT<0.15$.

According to another aspect of the present invention, an optical scanning device includes a light source that emits light beams, a deflector that deflects the light beams in a main scanning direction, a coupling optical system that guides the light beams from the light source to the deflector, and a scanning optical system that scans the light beams on a target surface to form an image. The scanning optical system includes at least one diffractive optical surface. When linearly approximated, temperature dependence $d\lambda/dT$ of wavelength of the light source satisfies $d\lambda/dT<0.15$.

According to still another aspect of the present invention, an image forming apparatus includes an optical scanning device including a light source that emits light beams, a deflector that deflects the light beams in a main scanning direction, a coupling optical system that guides the light beams from the light source to the deflector, and a scanning optical system that scans the light beams on a target surface to form an image. Any one of the coupling optical system and the scanning optical system includes at least one diffractive optical surface. When linearly approximated, temperature dependence dλ/dT of wavelength of the light source satisfies dλ/dT<0.15.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6A is a graph of a shape of the entrance surface and the exit surface of the first scanning lens in a main-scanning cross section;

FIG. 6B is a graph of a shape of the entrance surface and the exit surface of the second scanning lens in a main-scanning cross section;

FIG. 20 is a schematic diagram of an image forming apparatus using the optical scanning device according to any one of the embodiments.

DETAILED DESCRIPTION OF THE PREFERRED EMBODIMENTS

Exemplary embodiments of the present invention are explained in detail below with reference to the accompanying drawings.

Figure 1:
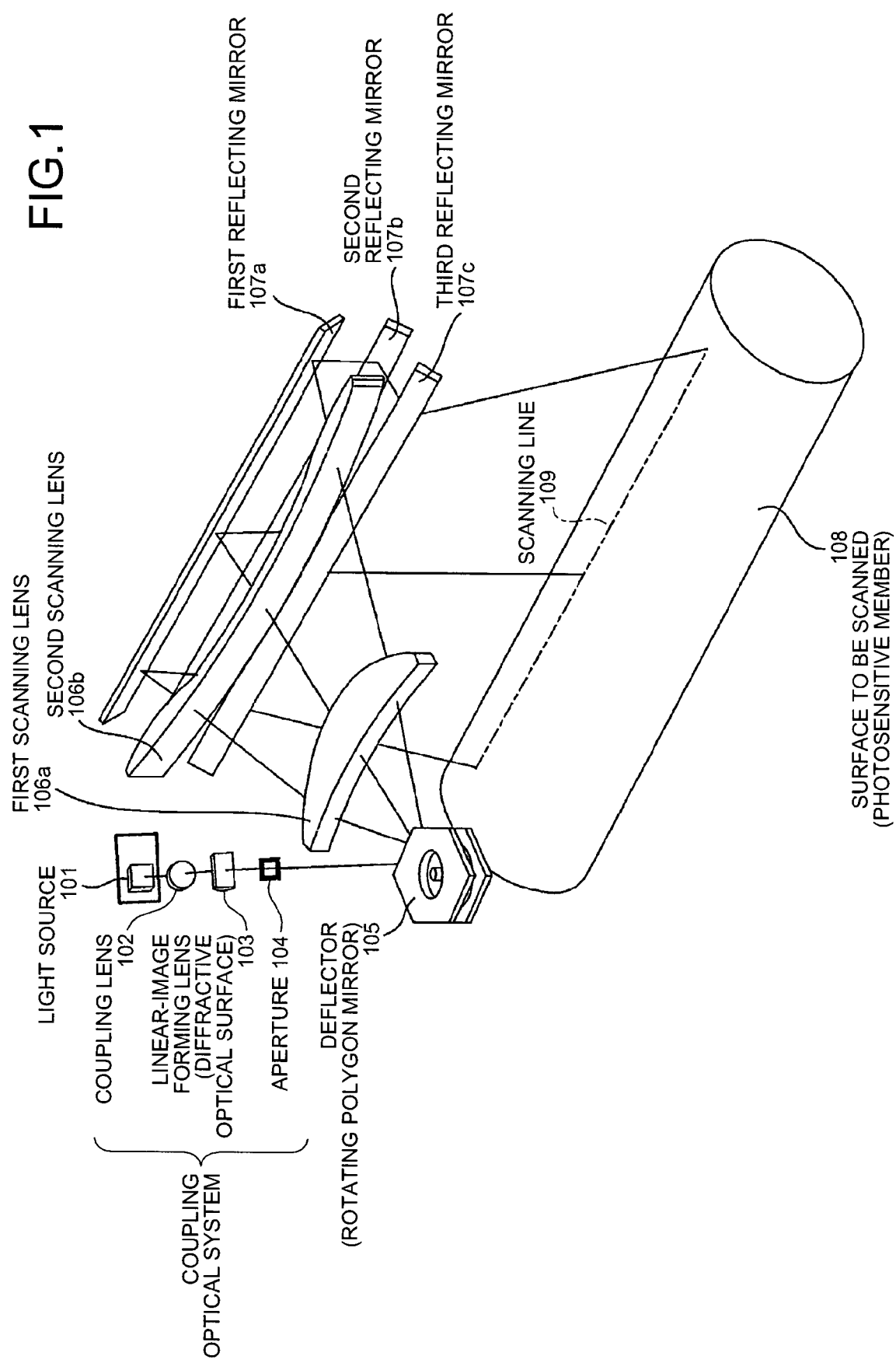
FIG. 1 is a schematic diagram of an optical system in an optical scanning device according to a first embodiment of the present invention.
Figure 2:
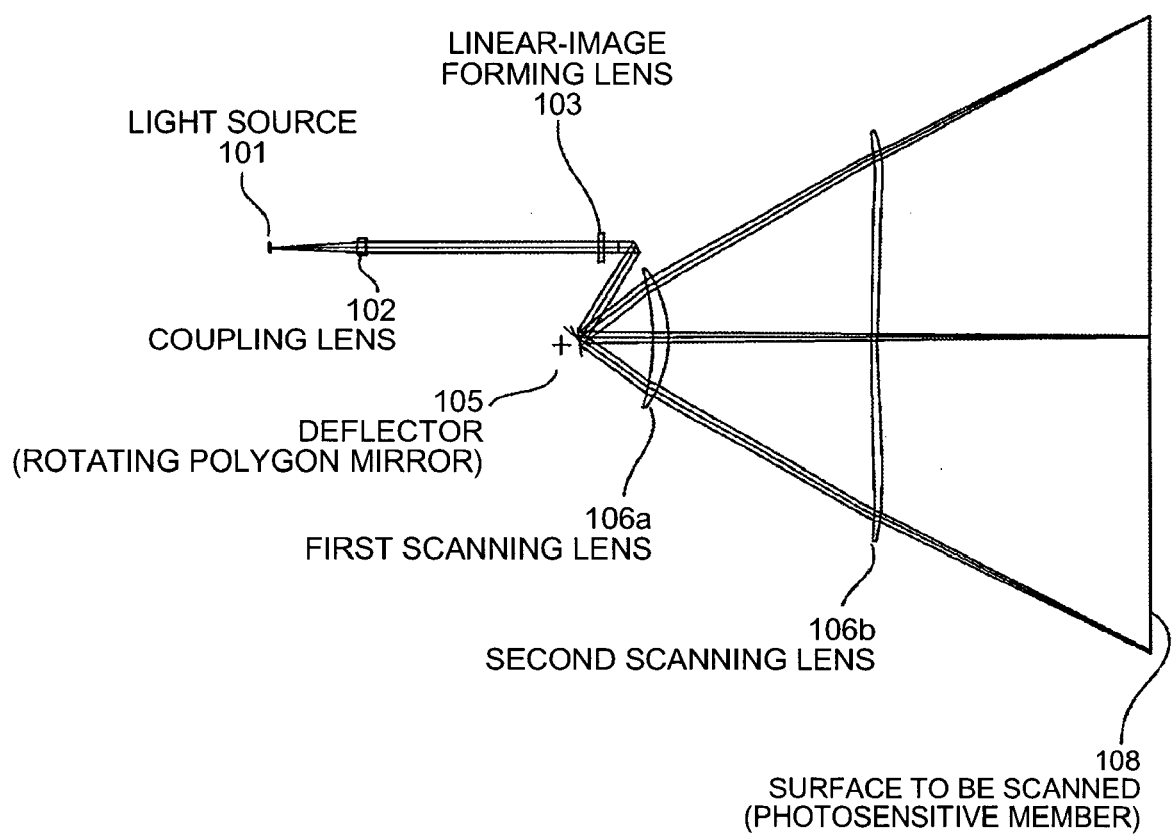
FIG. 2 is a schematic diagram of an optical path of the optical system shown in FIG. 1.

FIG. 1 is a schematic diagram of an optical system in an optical scanning device according to a first embodiment of the present invention. A plurality of laser beams is emitted from a light source 101, and is coupled by a coupling optical system to form a light flux. The coupling optical system includes a coupling lens 102, a linear-image forming lens 103, and an aperture 104. The laser beams are coupled and then deflectively reflected by a deflector 105 formed of a rotating polygon mirror to be scanned in the main scanning direction. Through a first scanning lens 106a and a second scanning lens 106b which form the scanning optical system, an image is formed as a scanning line 109 on a surface 108 to be scanned (image plane) or on a cylindrical image carrier that supports a photosensitive medium. The image carrier rotates around its axis to move the image plane in a direction perpendicular to the main scanning direction, and is optically scanned to form an image thereon. FIG. 2 is a schematic diagram of an optical path without a first reflecting mirror 107a, a second reflecting mirror 107b, and a third reflecting mirror 107c shown in FIG. 1.

In this case, by providing a diffractive optical surface on the linear-image forming lens 103, the linear-image forming lens 103 can be one that has a cylindrical shape as a base and has a function of collecting light in the sub-scanning direction using a combined effect of both diffraction and refraction. In the first embodiment, the light source 101 is designed so that temperature dependence dλ/dT (nm/° C.) of wavelength of the light source 101 satisfies the following condition:

dλ/dT<0.15

It is known that a lens with diffraction effect has the k-th order diffraction efficiency ηk in a paraxial area as expressed by the following expression (1):

$$\eta = \left(\text{sinc}\left(\frac{\lambda 0}{\lambda} - k\right)\right)^2 \qquad (1)$$

where λ0 is wavelength of the light source at design temperature, λ is wavelength of the light source after the temperature changes, and k is the number of diffraction order.

The temperature dependence dλ/dT (nm/° C.) is assumed that a change rate of an oscillation wavelength per temperature change of 1° C. is linearly approximated around the design temperature.

Figure 3:
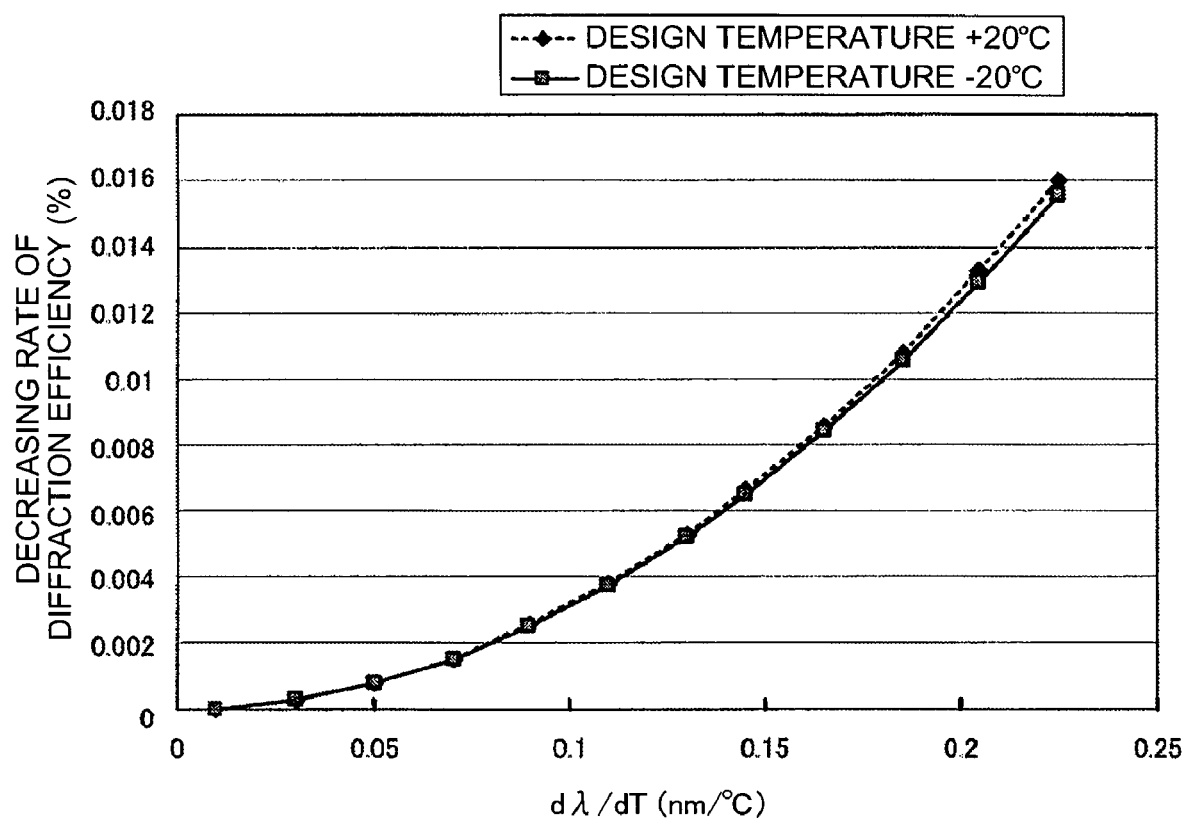
FIG. 3 is a graph of temperature dependence dλ/dT of wavelength of a light source and a decreasing rate of diffraction efficiency when temperature changes in a range of ±20° C.

FIG. 3 is a graph plotting a decreasing rate of diffraction efficiency η (expression (1)) when the temperature dependence dλ/dT of the wavelength of the light source is changed and the temperature changes in a range of ±20° C. from the design temperature. In FIG. 3, if the light source is designed under the conditions of a design wavelength of 650 nanometers and a temperature of, for example, 25° C., then the light-use efficiency under an environment of 45° C. allows the decreasing rate of the diffraction efficiency η to be reduced to about one-half in the case where a light source with temperature dependence dλ/dT=0.145 is used as compared with the case where an edge-emitting type semiconductor laser is used as a light source, the edge-emitting type semiconductor laser (temperature dependence dλ/dT=about 0.22) having an oscillation wavelength of about 780 nanometers used in an ordinary optical scanning device.

The temperature dependence dλ/dT or the temperature change of the oscillation wavelength of a laser-light emitting element is determined depending on a gain spectrum of a laser medium and a resonator length of a laser in an ordinary laser having no particular configuration. On the other hand, in the edge-emitting type semiconductor laser widely used at present, it is designed so that the temperature dependence dλ/dT is in a range from 0.20 to 0.25 and, thus, the wavelength variation is large, which causes the diffraction efficiency to decrease.

FIG. 3 depicts changes in the diffraction efficiency when a theoretically accurate diffraction shape can be formed. Actually, the diffraction efficiency largely decreases more than that of FIG. 3 due to an error between diffraction gratings or due to a shape error between diffraction structures. Therefore, by using the light source in which the temperature dependence of the wavelength of the light source is set as explained in the condition of the temperature dependence dλ/dT<0.15, the decrease in the diffraction efficiency can be effectively prevented and satisfactory optical scanning can be performed.

In response to a recent demand for a full-color printing, tandem-type image forming apparatuses are increasingly used that includes a plurality of optical scanning devices and photosensitive members to achieve high-speed image formation. A temperature distribution inside the image forming apparatus is not uniform, and because of this, if the diffraction efficiency largely changes due to temperature, the amount of exposure on each of the photosensitive member varies, which does not enable to obtain a desired image. Particularly, in the full-color image forming apparatus, colors vary, which leads to degradation of image quality. According to the optical scanning device of the present invention as a solution against the problem, a satisfactory image can be formed.

The diffractive optical surface of the linear-image forming lens 103 has a function of collecting light beams in the sub-scanning direction because of its diffraction function provides as a shape which has a line-symmetric axis parallel to the main scanning direction. However, light beams are not converted in the main scanning direction. The shape having the line-symmetric axis parallel to the main scanning direction indicates a shape including a diffraction structure. As for a linear-shaped diffractive optical surface, in particular, if it is molded with resin, a die mold can easily be formed by linearly moving a cutting tool (blade), and cutting work is also easily performed, to enable achievement of cost reduction.

An element having the diffractive optical surface in the first embodiment, for example, the linear-image forming lens 103 is formed with a binary diffractive optical element which has a grating structure formed with a step-shaped diffraction grating made by photo etching, or with a Fresnel-shaped diffractive optical element which has a grating structure formed with a serrate diffraction grating made by cutting the surface thereof. Even if the optical element has any other structure if it is provided with the diffraction effect, the same effect can be obtained, and therefore, a method of manufacturing an element with the diffractive optical surface and a structure of the element are not limited. This fact entirely goes for any element having the following diffractive optical surface.

In the optical system of the optical scanning device shown in FIG. 1, a lateral magnification βm in the main scanning direction and a lateral magnification βs in the sub-scanning direction are set to satisfy the condition expressed by the following expression (2):

$$|\beta s|<|\beta m| \qquad (2)$$

In the first embodiment, the focal lengths in the main scanning direction of the optical system that includes the coupling lens 102, the linear-image forming lens 103, and the first and the second scanning lenses 106a and 106b are 45 millimeters (mm), ∞ (no refractive power), and 247 millimeters, respectively. The light beams emitted from the light source 101 is converted to a substantially parallel light by the coupling lens 102 in the main scanning direction, and is deflectively scanned by the deflector 105, to form an image on the surface 108 to be scanned by the scanning optical system. Therefore, the magnitude |βm| of the lateral magnification in the main scanning direction is about 5.5 times (|βm|=247/45~5.5).

As for the sub-scanning direction, the focal lengths of the coupling lens 102 and the linear-image forming lens 103 are 45 millimeters and 126 millimeters, respectively, and based on the values, the lateral magnification β=126/45=2.8, and thus, the lateral magnification of the optical system in the sub-scanning direction is β=−0.96. Therefore, the magnitude |βs| of the lateral magnification in the sub-scanning direction is about 2.7 times (|βs|=2.8×0.96~2.7). This value satisfies the condition expressed by the expression (2). The effect is as explained below.

By setting the temperature dependence dλ/dT of the wavelength to be smaller (<0.15) than the conventional one, the decrease in the diffraction efficiency can be prevented. However, to correct the change of the beam waist position of the lens by using the diffraction effect to obtain a desired one, the power of the element having the diffractive optical surface has to be increased. The increase in the power of the diffractive optical surface means miniaturization of the diffraction structure. When micromachining is provided by using the same manufacturing technology like the diffractive optical surface, the rate of an error increases more as the structure is finer, and the diffraction efficiency thereby decreases, which causes unused-order diffracted light to occur as stray light.

In the conventional optical system, the beam waist position largely varies in the sub-scanning direction caused by temperature (variation of field curvature). In other words, greater diffraction effect in the sub-scanning direction is required as compared with that in the main scanning direction. Therefore, by decreasing the lateral magnification in the sub-scanning direction as compared with that in the main scanning direction, the change amount of the beam waist position in the sub-scanning direction is reduced. As a result, the amount of correction required for the element having the diffractive optical surface is reduced, and this reduction allows power of the diffractive optical surface to be decreased. Therefore, even if the temperature dependence of the wavelength of the light source is set to satisfy the condition: dλ/dT<0.15, and even if the machining technology is a conventional low-cost method, it is possible to prevent the decrease of the diffraction efficiency.

Moreover, a resin lens is used for the optical system of the optical scanning device because the resin lens can be manufactured at a cost lower than that of a glass lens. The resin lens is highly hydroscopic, has large thermal expansion and refractive index variation due to temperature, and easily causes the beam waist position to shift, as compared with the glass lens. However, even if such a resin lens as above is used, these disadvantages can be corrected by making effective use of the diffraction effect. Thus, an optical scanning device can be provided at a lower cost.

As the light source 101, a vertical cavity surface-emitting laser (VCSEL) can be used. The VCSEL is a light emitting element having a structure suitable for mass production because a large number of light emitting portions can be formed on a wafer at a time and can be easily and concurrently inspected. Moreover, the VCSEL has optically stable properties such that oscillation-wavelength variation in the wafer is small and wavelength variation between elements can be suppressed significantly as compared to that of an edge-emitting type laser diode (LD) array. Furthermore, in the VCSEL, the resonator length related to laser oscillation is extremely small such as one wavelength to several wavelengths. Therefore, an oscillation mode interval can be made wider, mode hopping can be suppressed, and the temperature dependence dλ/dT of oscillation wavelength can be reduced. Thus, it is easy to set the temperature dependence to a low value.

In the VCSEL, its divergence angle (Full Width Half Maximum or FWHM) can be reduced such as about 8 to 15 degrees in both the main scanning direction and the sub-scanning direction. Therefore, even if the coupling lens is caused to have a long focal length, the loss of the light amount is small. By making the focal length longer, the power decreases, and the shift amount of the focal position due to temperature variation can be reduced. This fact indicates that the power of the diffractive optical element to compensate for shift of the focal position may be small, and as a result, a compensation error is reduced. From these reasons, concurrently using the VCSEL and the diffractive optical element for the optical scanning device and the image forming apparatus is extremely effective in preventing degradation of image quality.

Figure 4:
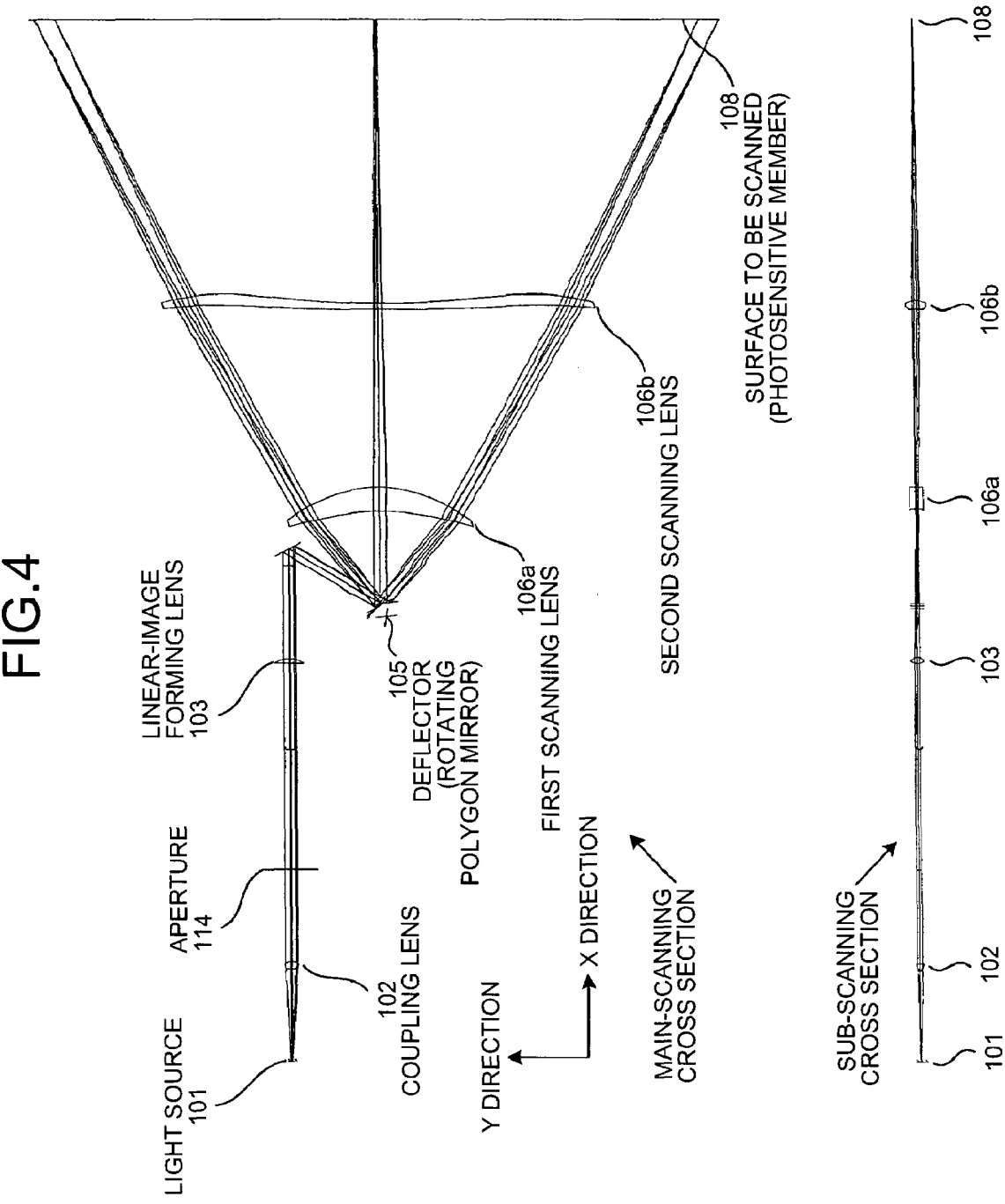
FIG. 4 is a schematic diagram of an optical path of an optical system according to a second embodiment of the present invention.

FIG. 4 is a schematic diagram of an optical path of an optical system according to a second embodiment of the present invention. In FIG. 4, the upper diagram is a main-scanning cross section and the lower diagram is a sub-scanning cross section. The optical surface shape of the scanning lens can be expressed by the following expressions (3) and (4):

$$X(Y) = \frac{Cm0 \times Y^2}{1 + \sqrt{1 - (1 + a00) \times Cm0^2 \times Y^2}} + a01 \times Y + a02 \times Y^2 + a03 \times Y^3 + a04 \times Y^4 + \ldots \quad (3)$$

$$Cs(Y) = \frac{1}{Rs0} + b01 \times Y + b02 \times Y^2 + b03 \times Y^3 + \ldots \quad (4)$$

where X represents a coordinate in the optical axis direction (direction parallel to the horizontal axis of FIG. 4), and Y represents a coordinate in the main scanning direction (direction parallel to the vertical axis of FIG. 4). In the expressions (3) and (4), Cm0 represents a curvature of a central line (Y=0) in the main scanning direction and is an inverse number to a curvature radius Rm; and a00, a01, a02, . . . are aspheric coefficients of a main-scanning shape. Cs(Y) represents a curvature related to Y in the sub-scanning direction. Rs0 represents a curvature on the optical axis in the sub-scanning direction; and b01, b02, b03, . . . are aspheric coefficients of a sub-scanning shape. Specific numerical values are shown in table 1.

TABLE 1

|  | L1R1 | L1R2 | L2R1 | L2R2 |
|---|---|---|---|---|
| Rm | −120 | −59.279 | −10000 | 540.625 |
| Rs0 | −500 | −600 | 521.92 | −40.751 |
| a00 | 0.00000E+00 | 0.00000E+00 | 0.00000E+00 | 0.00000E+00 |
| a04 | 8.88524E−07 | 9.22409E−07 | 3.28563E−07 | 1.27798E−07 |
| a06 | −2.62914E−10 | 6.77825E−11 | −7.08542E−11 | −4.62873E−11 |
| a08 | 2.18464E−14 | −4.11244E−14 | 6.26922E−15 | 4.04921E−15 |
| a10 | 1.36766E−17 | 1.3728E−17 | −2.73157E−19 | −1.65975E−19 |
| a12 | −3.13542E−21 | 2.06956E−21 | 4.73881E−24 | 2.58548E−24 |
| b01 | — | −1.59477E−06 | −7.57567E−07 | — |
| b02 | — | −4.33213E−06 | −1.1328E−06 | 2.31146E−07 |
| b03 | — | 4.98199E−09 | 2.60617E−10 | — |
| b04 | — | −2.85938E−09 | 7.89614E−11 | — |
| b05 | — | −2.67713E−12 | −5.02709E−14 | — |
| b06 | — | 2.87783E−13 | 1.40512E−14 | — |
| b07 | — | −1.91653E−15 | 4.55389E−18 | — |
| b08 | — | 2.04238E−15 | −2.01401E−18 | — |
| b09 | — | 1.01413E−18 | −1.54602E−22 | — |
| b10 | — | −6.72997E−19 | 7.48935E−23 | — |

Figure 5A:
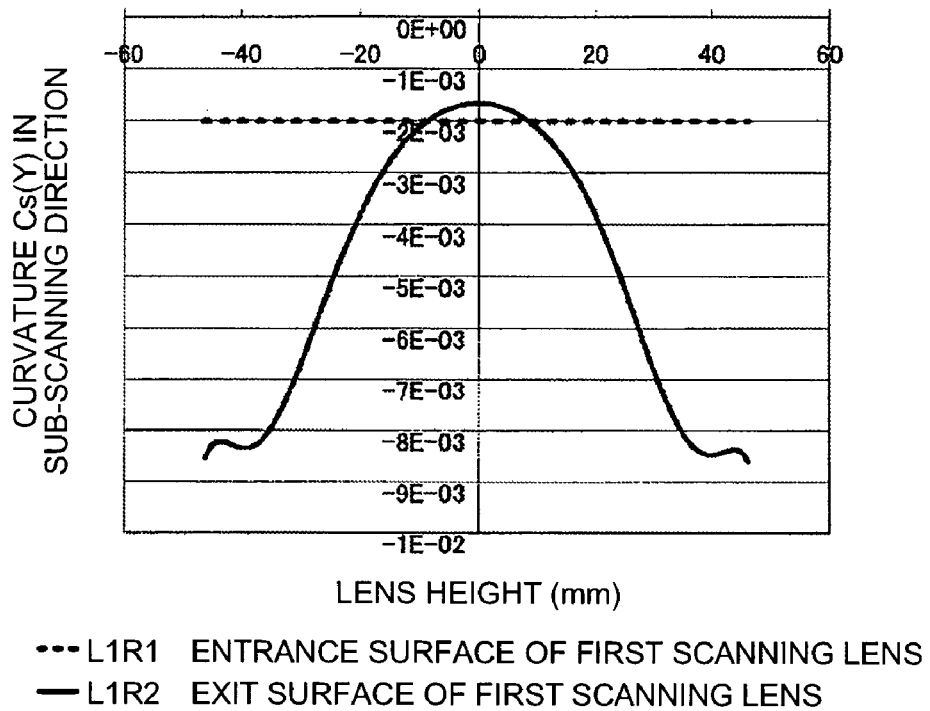
FIG. 5A is a graph of functions Cs(Y) of curvature of an entrance surface and an exit surface of a first scanning lens in a sub-scanning direction for each lens height.
Figure 5B:
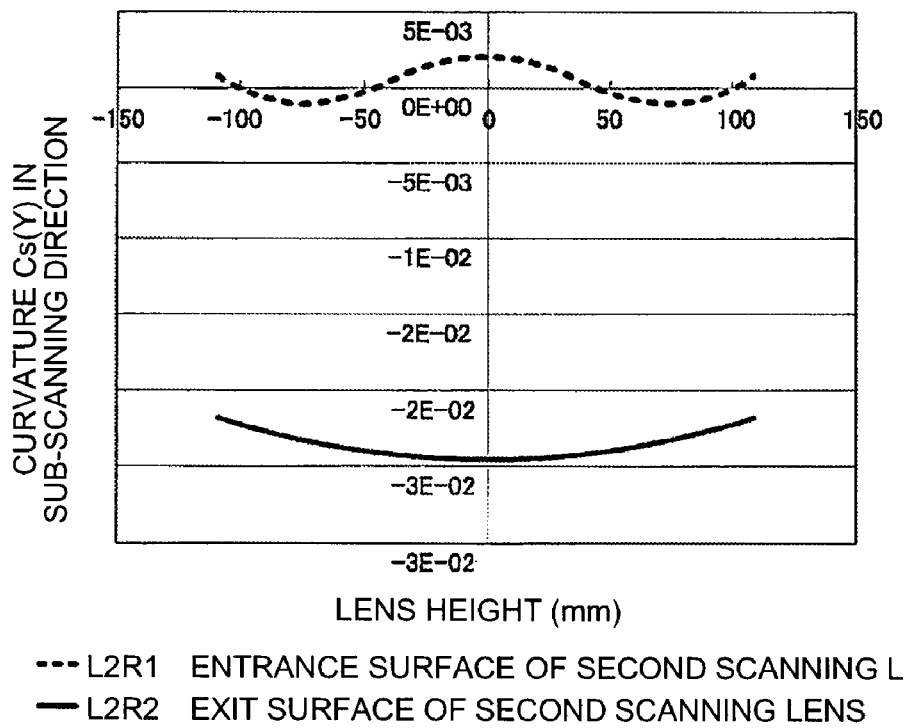
FIG. 5B is a graph of functions Cs(Y) of curvature of an entrance surface and an exit surface of a second scanning lens in a sub-scanning direction for each lens height.

L1R1: Entrance surface of first scanning lens
L1R2: Exit surface of first scanning lens
L2R1: Entrance surface of second scanning lens
L2R2: Exit surface of second scanning lens FIGS. 5A and 5B depict each function Cs(Y) of the curvatures in the sub-scanning direction for each lens height. In these figures, L1 and L2 represent the first and the second scanning lenses respectively, and R1 and R2 represent an entrance surface and an exit surface respectively. FIGS. 6A and 6B depict shapes of the first and the second scanning lenses respectively in the main-scanning cross section, each in which the upper line represents the shape of the exit surface R2 and the lower line represents the shape of the entrance surface R1. The vertical axis is a coordinate X in the optical axis direction, and the horizontal axis is a lens height. The optical axis is an axis passing through a central point in the sub-scanning direction when Y=0 in the expression (3) unless otherwise specified.

As shown in FIG. 4, the optical system is formed with a coupling optical system including the light source 101, the coupling lens 102, an aperture 114, and the linear-image forming lens 103; and a scanning optical system including the deflector 105, the first scanning lens 106a, and the second scanning lens 106b. The two scanning lenses are made of resin, and the diffraction grating may be formed on one or more optical surfaces.

The light source 101 has light emitting points which are two-dimensionally arrayed and can thereby emit a plurality of light beams by the single element. This type of light source is realized by VCSEL. The VCSEL has properties such that a temperature variation of the oscillation wavelength is small and a discontinuous change of wavelength (wavelength hopping) does not occur in principle and, thus, the optical property hardly deteriorates even by the environmental changes.

The coupling lens 102 and the linear-image forming lens 103 may be made of glass, or may be made of resin for cost reduction. If the both lenses are made of resin, a diffractive optical element may be provided to reduce deterioration of the optical property due to temperature change.

In the configuration of the second embodiment, the components can be as follows:

The oscillation wavelength of the light source 101 is 780 nanometers.

The coupling lens 102 has a focal length of 46.0 millimeters and converts light beams to substantially parallel light.

The linear-image forming lens 103 has a focal length of 104.7 millimeters and focuses the light beams near a deflection reflecting surface in the sub-scanning direction to form an image.

The aperture 114 restricts the light beams in the main scanning direction and the sub-scanning direction, and adjusts the beam-spot diameter. The shape thereof is a rectangle or an oval of which full width in the main scanning direction is 5.64 millimeters and full width in the sub-scanning direction is 2.2 millimeters.

The deflector 105 is a four-facet mirror in which a radius of an inscribed circle is 7 millimeters, and rotates at a constant speed around an axis parallel to the sub-scanning direction.

The central (on the optical axis) wall thickness of the first scanning lens 106a is 13.5 millimeters, and the central wall thickness of the second scanning lens 106b is 3.5 millimeters.

A light path length from the deflector 105 to the surface 108 to be scanned is 295.5 millimeters.

A distance from a reflecting point of the deflector 105 to the entrance surface (first surface) of the first scanning lens 106a is 46.3 millimeters, and a distance from the reflecting point to the entrance surface (first surface) is 149.5 millimeters.

The lateral magnification of the optical system in the sub-scanning direction is 2.2 times, and the lateral magnification of only the scanning optical system is −0.97 times.

A write width is ±161.5 millimeters.

Beam-spot diameters as target values are 52 micrometers (μm) in the main scanning direction and 55 micrometers in the sub-scanning direction.

A distance from the exit surface (second surface) of the first scanning lens 106a to the entrance surface of the second scanning lens 106b is 89.7 millimeters, and a distance from the exit surface (second surface) of the second scanning lens 106b to the surface 108 to be scanned is 142.5 millimeters.

Figure 7:
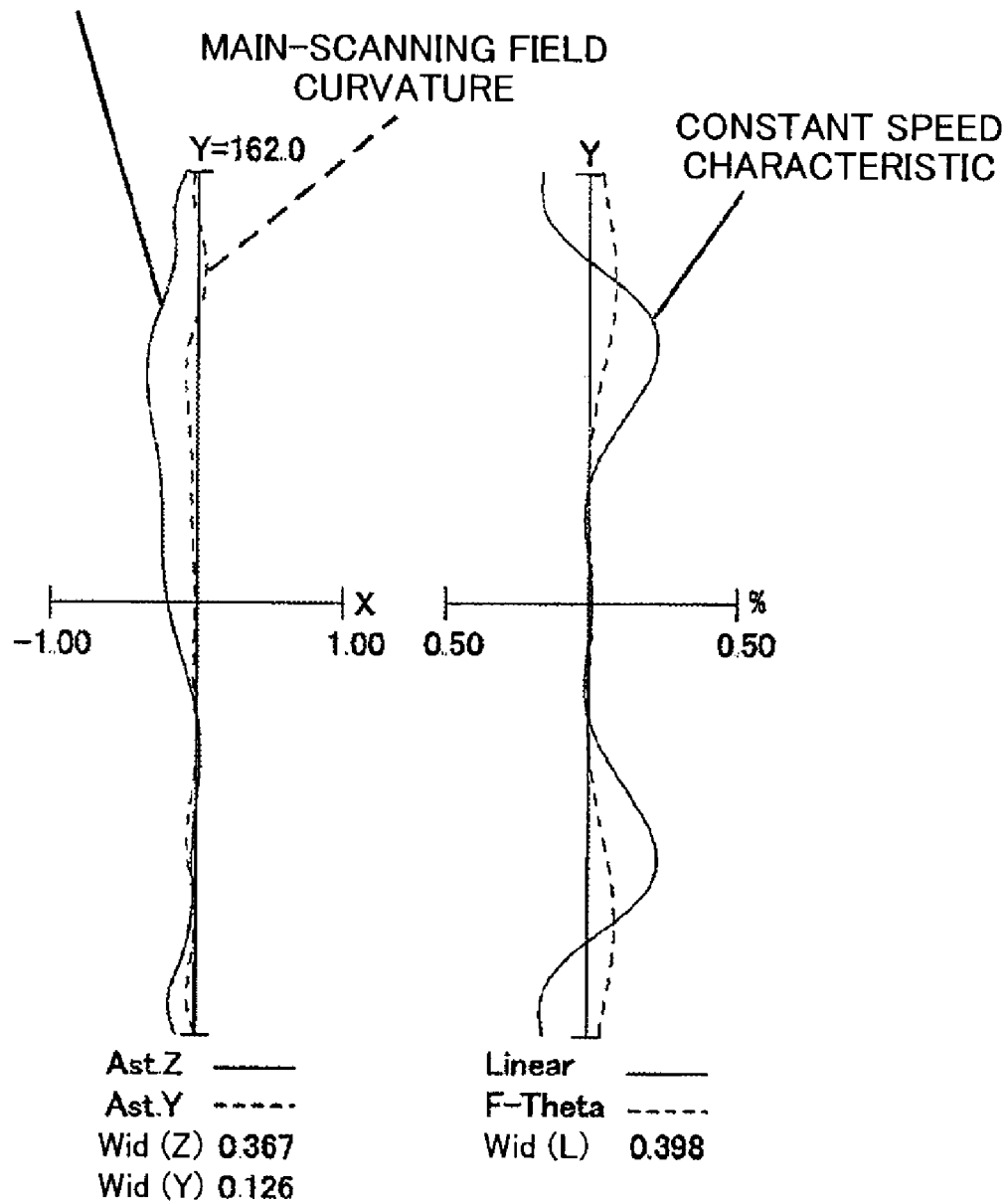
FIG. 7 is a schematic diagram of field curvatures in a main scanning direction and the sub-scanning direction.
Figure 8:
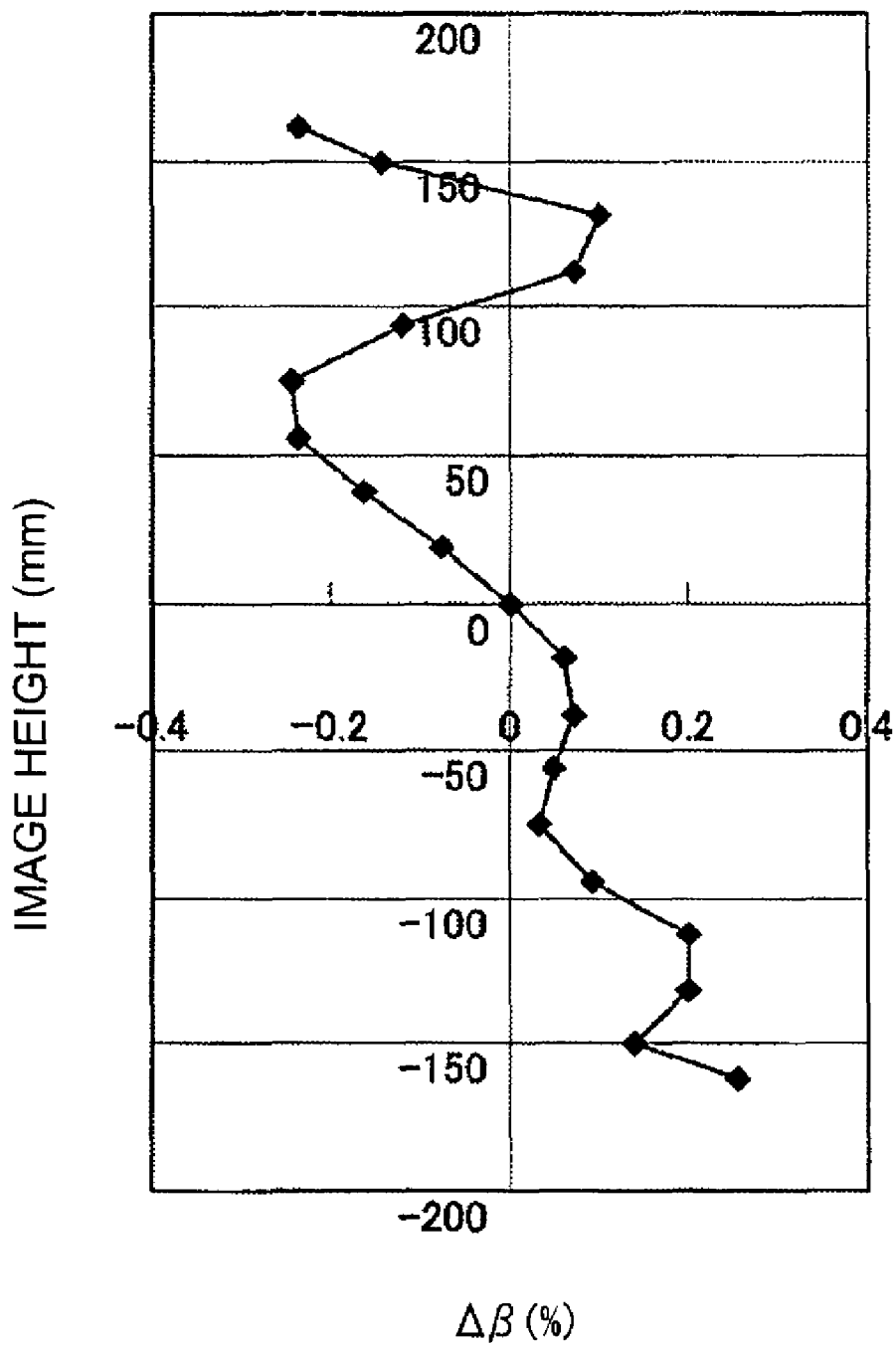
FIG. 8 is a graph of a difference in lateral magnification in the sub-scanning direction for each image height.
Figure 9A:
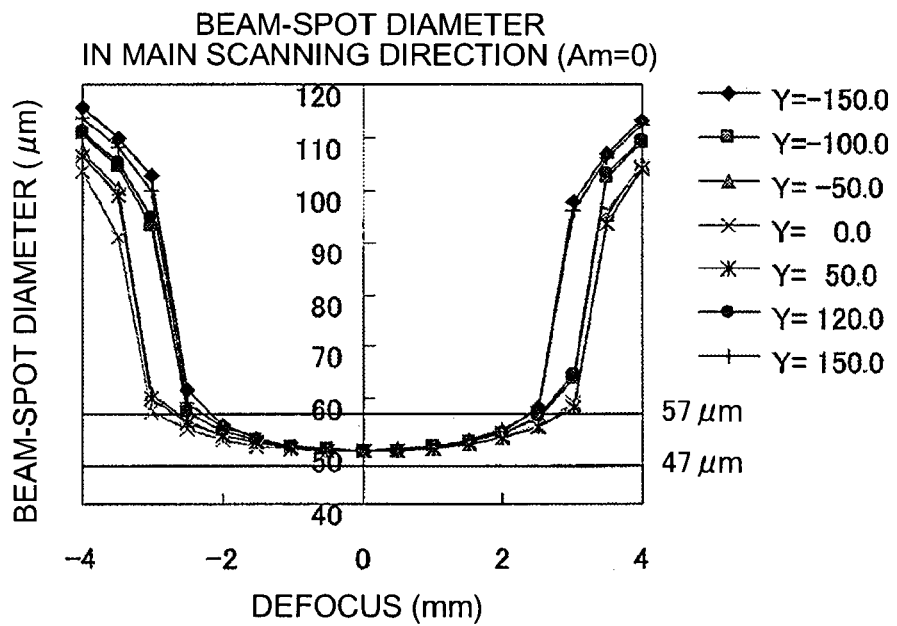
FIGS. 9A and 9B are graphs of a beam-spot diameter in the main scanning direction and the sub-scanning direction when the diameter of a light-emitting area A (Am, As) is zero according to the conventional technology.
Figure 9B:
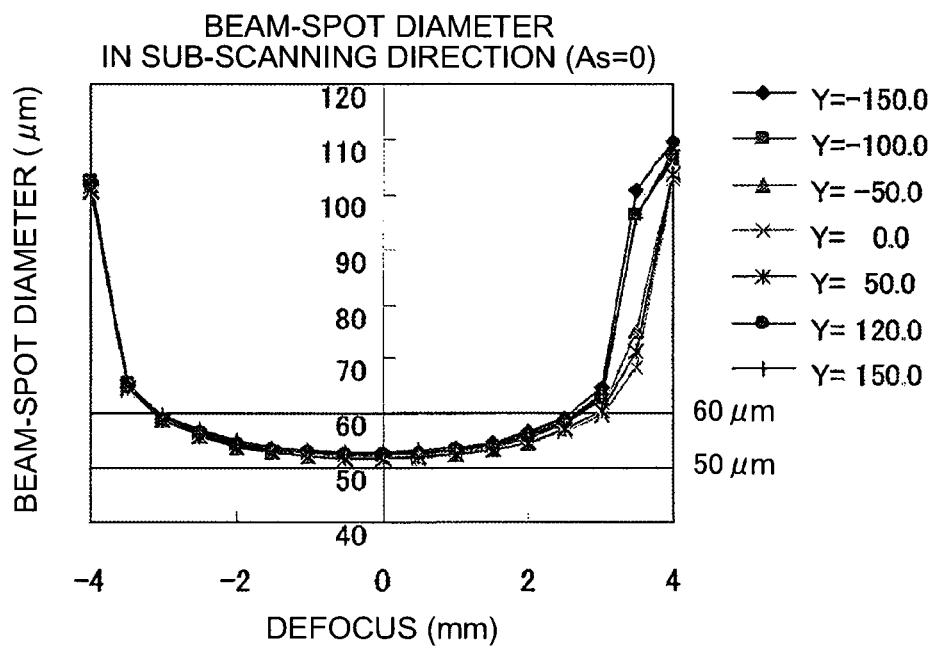
Figure 10A:
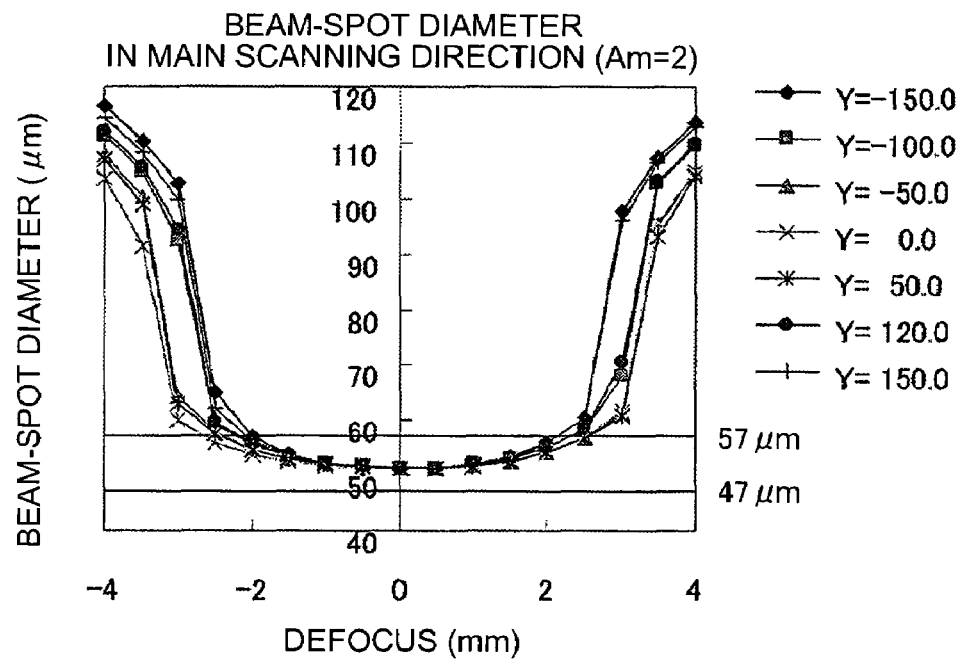
FIGS. 10A and 10B are graphs of a beam-spot diameter in the main scanning direction and the sub-scanning direction when the diameter of the light-emitting area A (Am, As) is 2 according to the conventional technology.
Figure 10B:
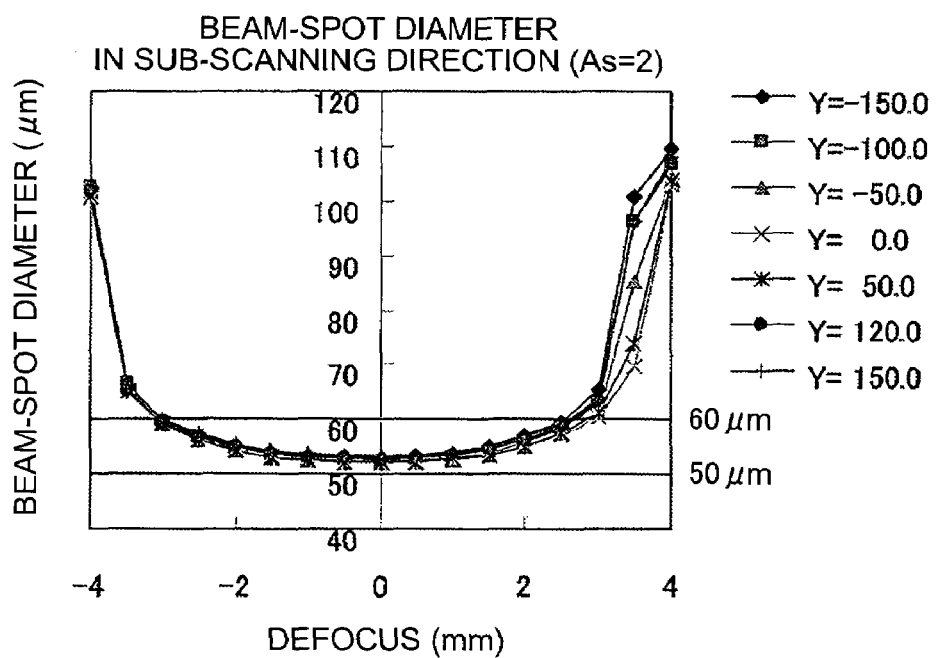
Figure 11A:
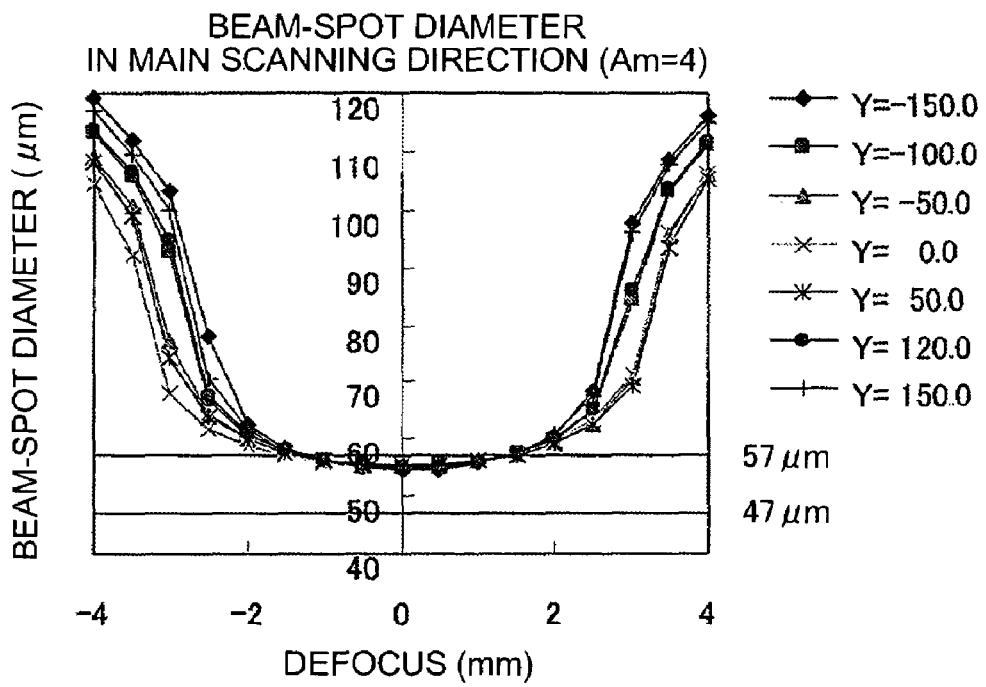
FIGS. 11A and 11B are graphs of a beam-spot diameter in the main scanning direction and the sub-scanning direction when the diameter of the light-emitting area A (Am, As) is 4 according to the conventional technology.
Figure 11B:
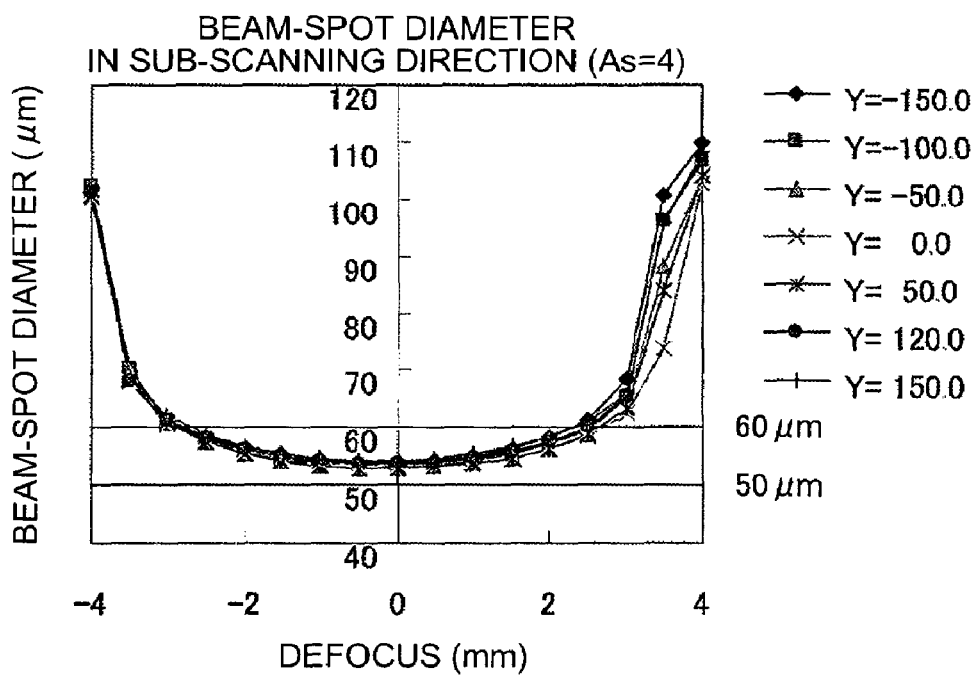
Figure 12A:
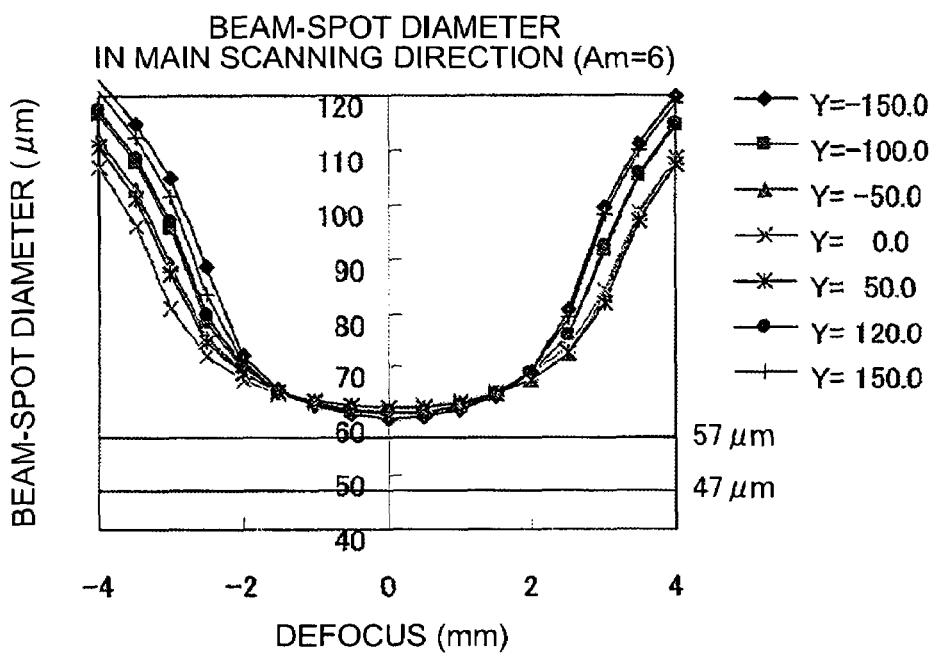
FIGS. 12A and 12B are graphs of a beam-spot diameter in the main scanning direction and the sub-scanning direction when the diameter of the light-emitting area A (Am, As) is 6 according to the conventional technology.
Figure 12B:
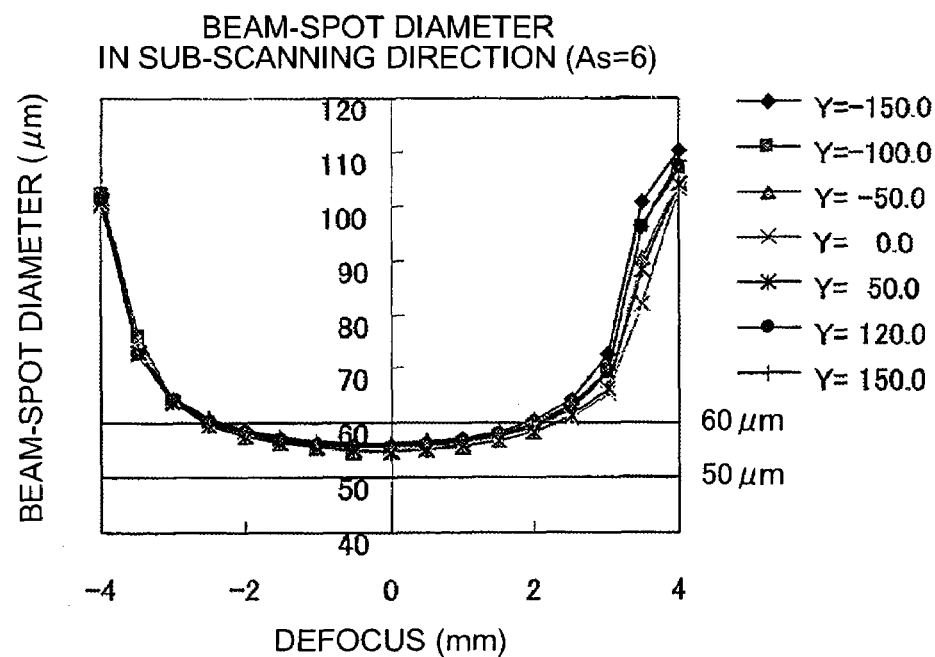
Figure 13A:
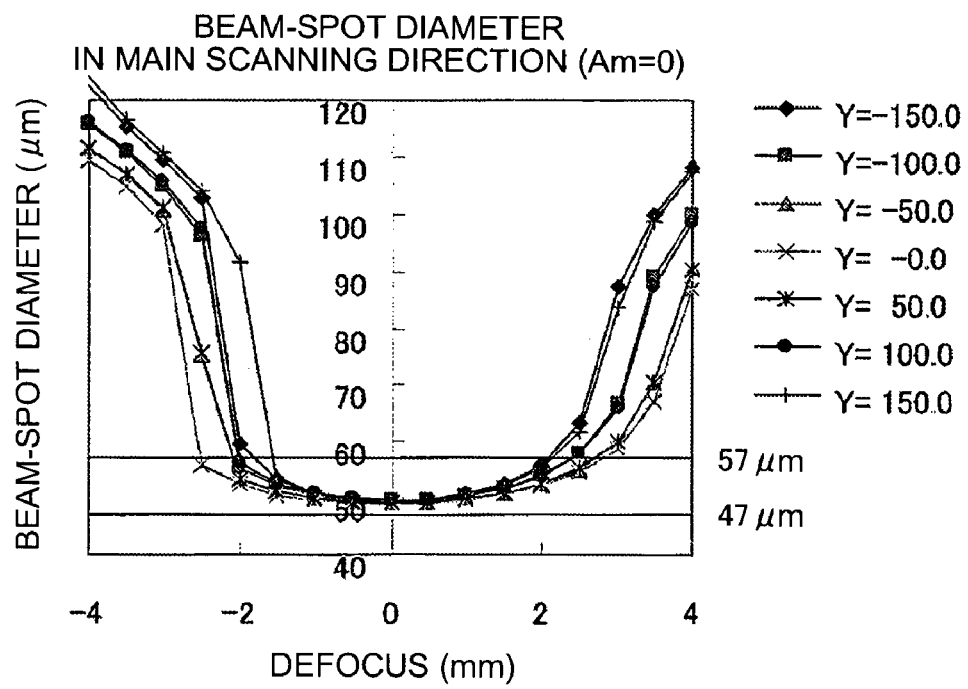
FIGS. 13A and 13B are graphs of a beam-spot diameter in the main scanning direction and the sub-scanning direction when the diameter of a light-emitting area A (Am, As) is zero according to the second embodiment.
Figure 13B:
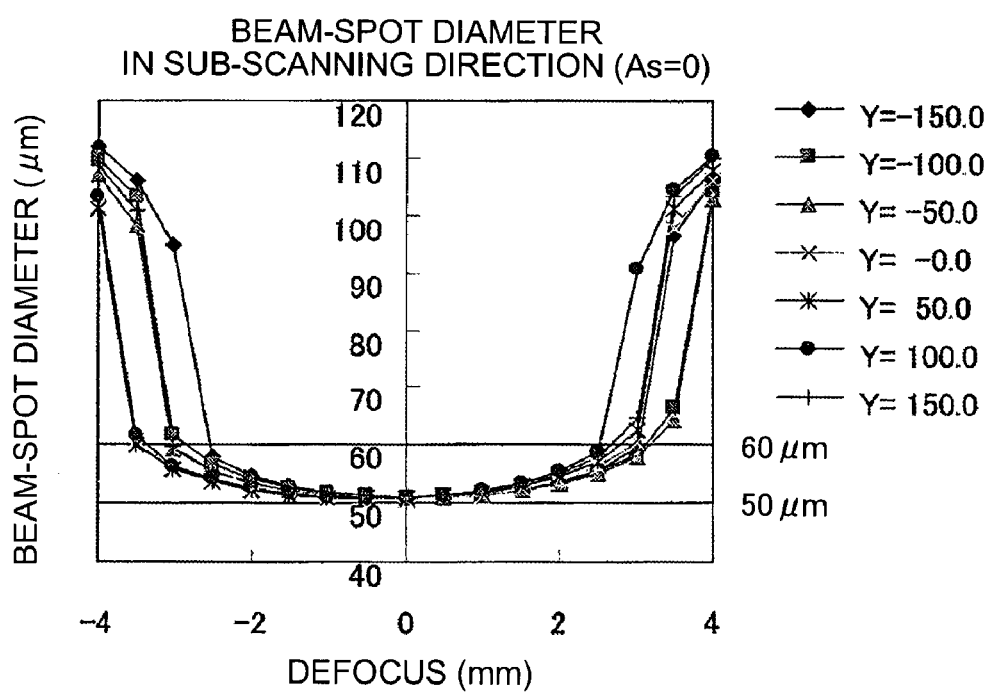
Figure 14A:
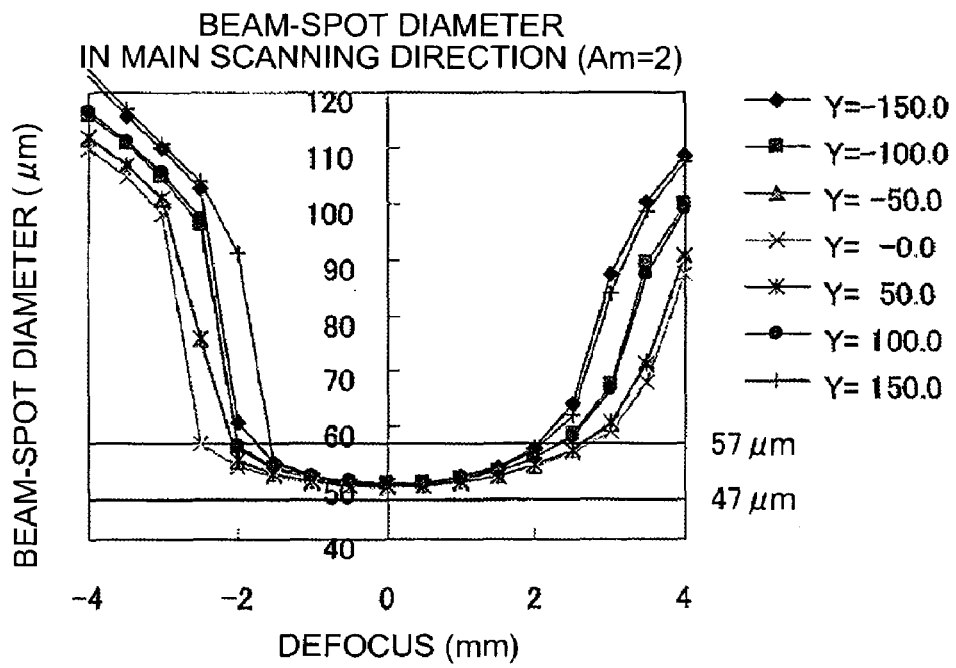
FIGS. 14A and 14B are graphs of a beam-spot diameter in the main scanning direction and the sub-scanning direction when the diameter of the light-emitting area A (Am, As) is 2 according to the second embodiment.
Figure 14B:
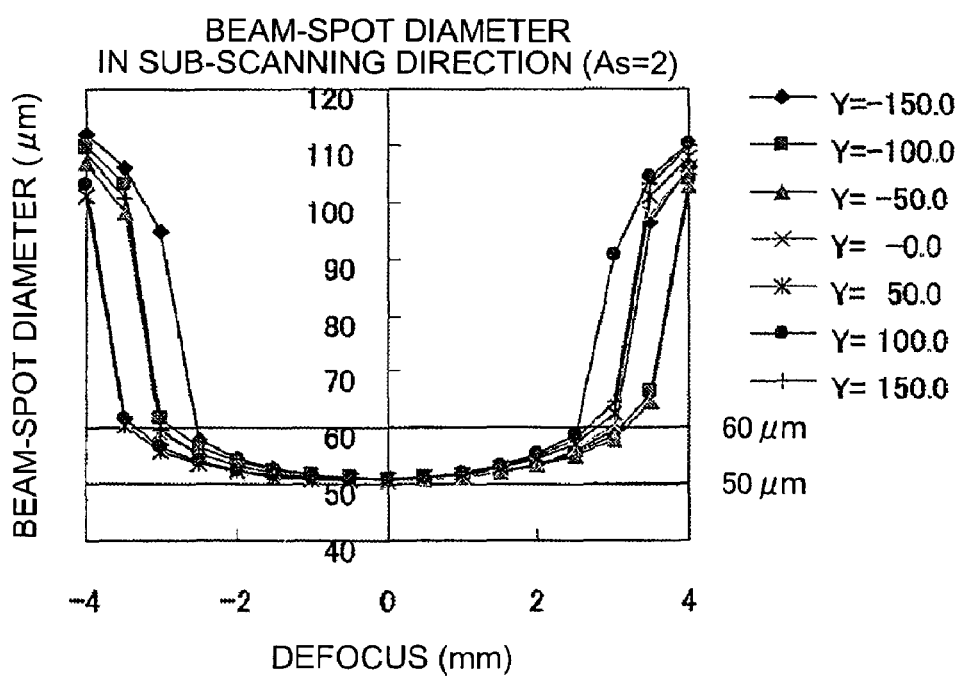
Figure 15A:
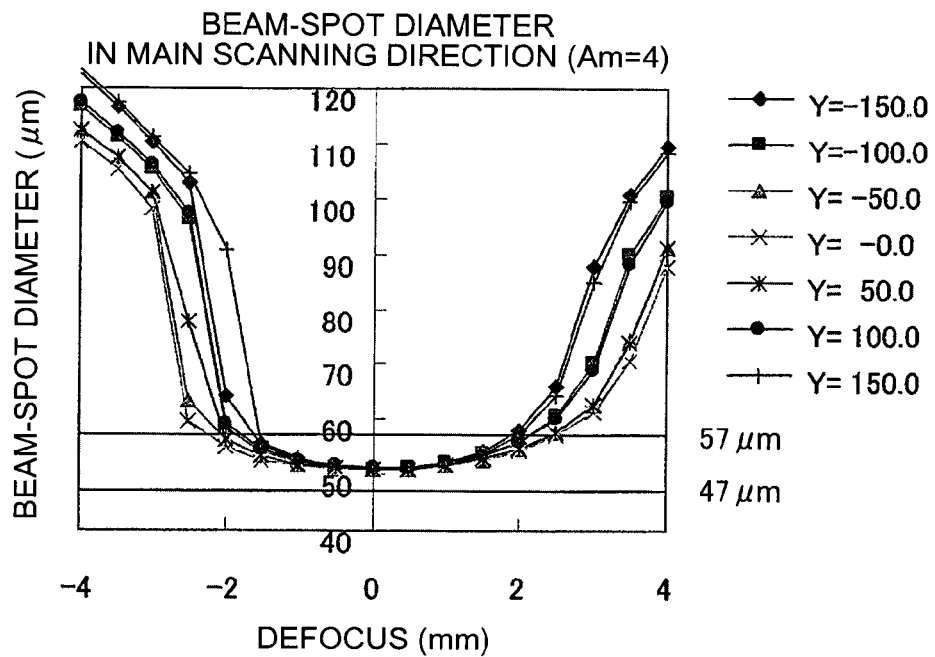
FIGS. 15A and 15B are graphs of a beam-spot diameter in the main scanning direction and the sub-scanning direction when the diameter of the light-emitting area A (Am, As) is 4 according to the second embodiment.
Figure 15B:
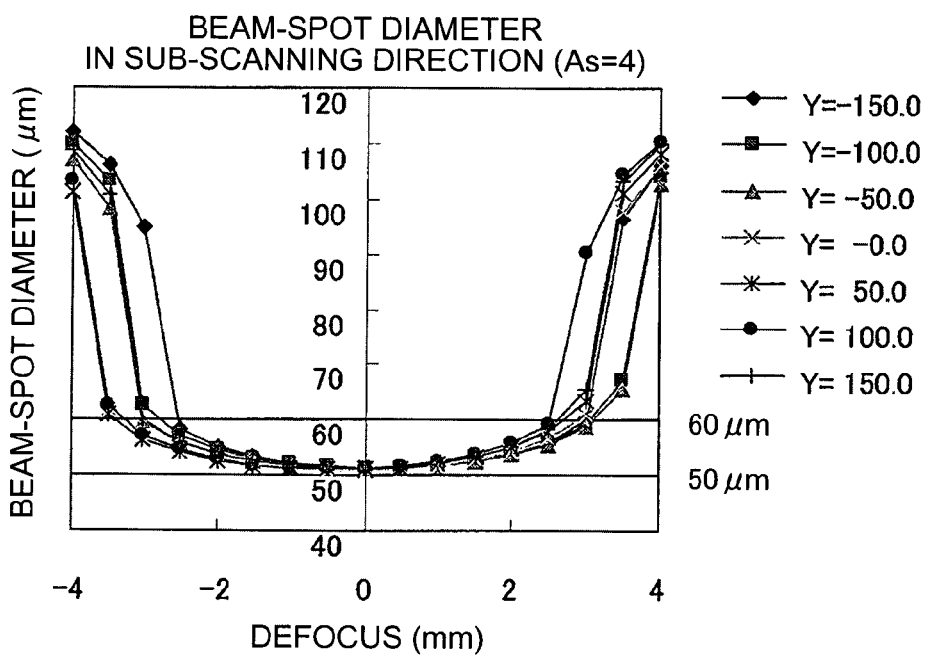
Figure 16A:
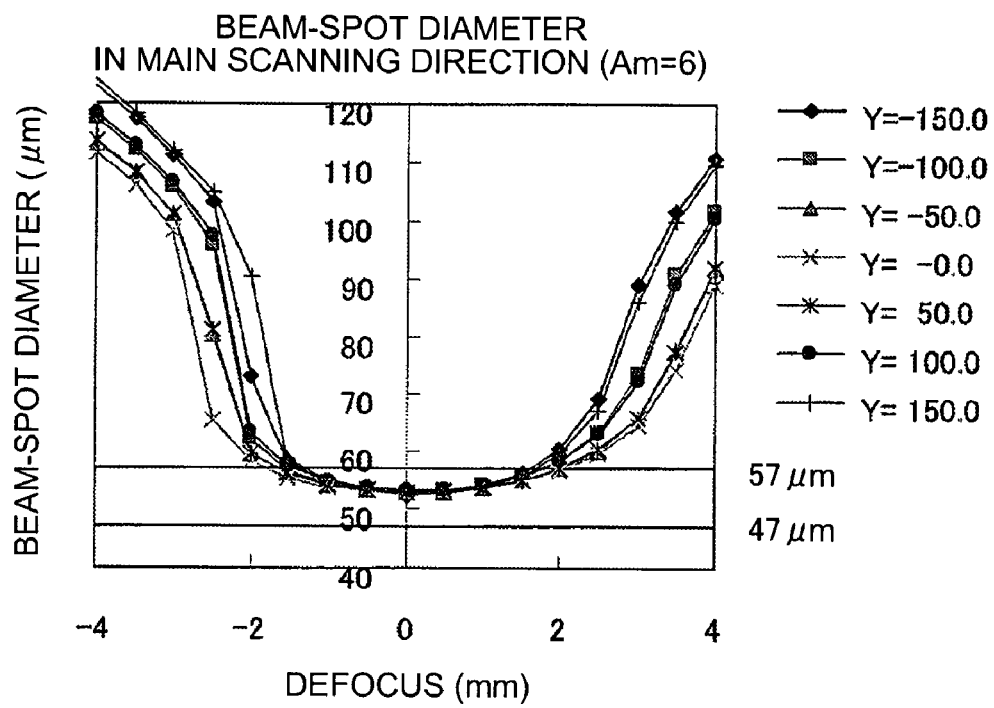
FIGS. 16A and 16B are graphs of a beam-spot diameter in the main scanning direction and the sub-scanning direction when the diameter of the light-emitting area A (Am, As) is 6 according to the second embodiment.
Figure 16B:
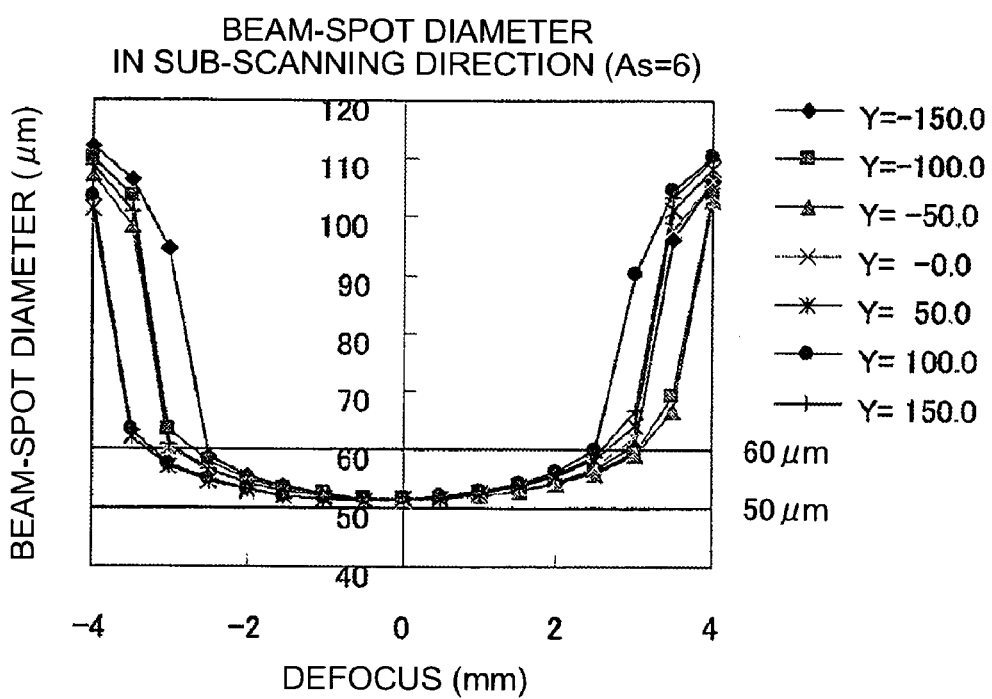

FIG. 7 depicts the field curvatures and FIG. 8 depicts a difference in lateral magnification in the sub-scanning direction based on the above configuration. As shown in FIG. 7, the image plane is quite smooth in the sub-scanning direction, and it is understood that the variation of the beam-spot diameter is very small although the wall thickness is reduced as explained above. As shown in FIG. 8, the difference between the lateral magnifications is suppressed to about 0.5%, which is substantially constant.

The relationship between the lateral magnification of the optical system, the diameter of the light-emitting area of the VCSEL, and the beam-spot diameter is explained below. Beam-spot diameters in the conventional optical system in which the focal length of the coupling lens 102 is 26.8 millimeters (lateral magnification in the main scanning direction: about 8.9 times, lateral magnification in the sub-scanning direction: about 4.5 times) are shown in FIGS. 9A and 9B to FIGS. 12A and 12B. Further, beam-spot diameters in the optical system according to the second embodiment in which the focal length of the coupling lens 102 is 47.7 millimeters (lateral magnification in the main scanning direction: about 5.0 times, lateral magnification in the sub-scanning direction: about 2.2 times) are shown in FIGS. 13A and 13B to FIGS. 16A and 16B. FIGS. 9A, 10A, 11A, 12A, 13A, 14A, 15A and 16A depict the beam-spot diameter in the main scanning direction, while FIGS. 9B, 10B, 11B, 12B, 13B, 14B, 15B and 16B depict the beam-spot diameter in the sub-scanning direction.

FIGS. 9A and 9B and FIGS. 13A and 13B correspond to the case where diameters of the light-emitting area are infinitely small (Am=As=0 μm, where Am is the diameter of the light-emitting area in the main scanning direction, and As is the diameter thereof in the sub-scanning direction). FIGS. 10A and 10B and FIGS. 14A and 14B correspond to Am=As=2 μm, FIGS. 11A and 11B and FIGS. 15A and 15B correspond to Am=As=4 μm, and FIGS. 12A and 12B and FIGS. 16A and 16B correspond to Am=As=6 μm. The target values of the beam-spot diameter ω in these optical systems are ωm×ωs (ωm: 52±5 μm, ωs: 55±5 μm), and each boundary is shown in the respective figures (ωm: beam-spot diameter in the main scanning direction, ωs: beam-spot diameter in the sub-scanning direction).

In the conventional optical systems (FIGS. 9A and 9B to FIGS. 12A and 12B), the depth of the beam can be sufficiently ensured and the beam-spot diameter does not largely vary until the diameter of the light-emitting area is 2 μm. However, when Am=4 μm or more, the depth in the main scanning direction sharply decreases and the variation easily increases. On the other hand, in the optical system according to the second embodiment (FIGS. 13A and 13B to FIGS. 16A and 16B), it is obvious that the depth can be ensured until Am=6 μm and the increase in the beam-spot diameter falls within an allowable range, and that an optical system with a low magnification is required for a light source in which the diameter of the light-emitting area is several micrometers or more. The VCSEL is such a light source as above, and it is therefore desirable that the VCSEL satisfies the condition: $(\beta \times A)/$ ω0<0.7 according to the second embodiment. This matter is explained below with reference to FIG. 17.

Figure 17:
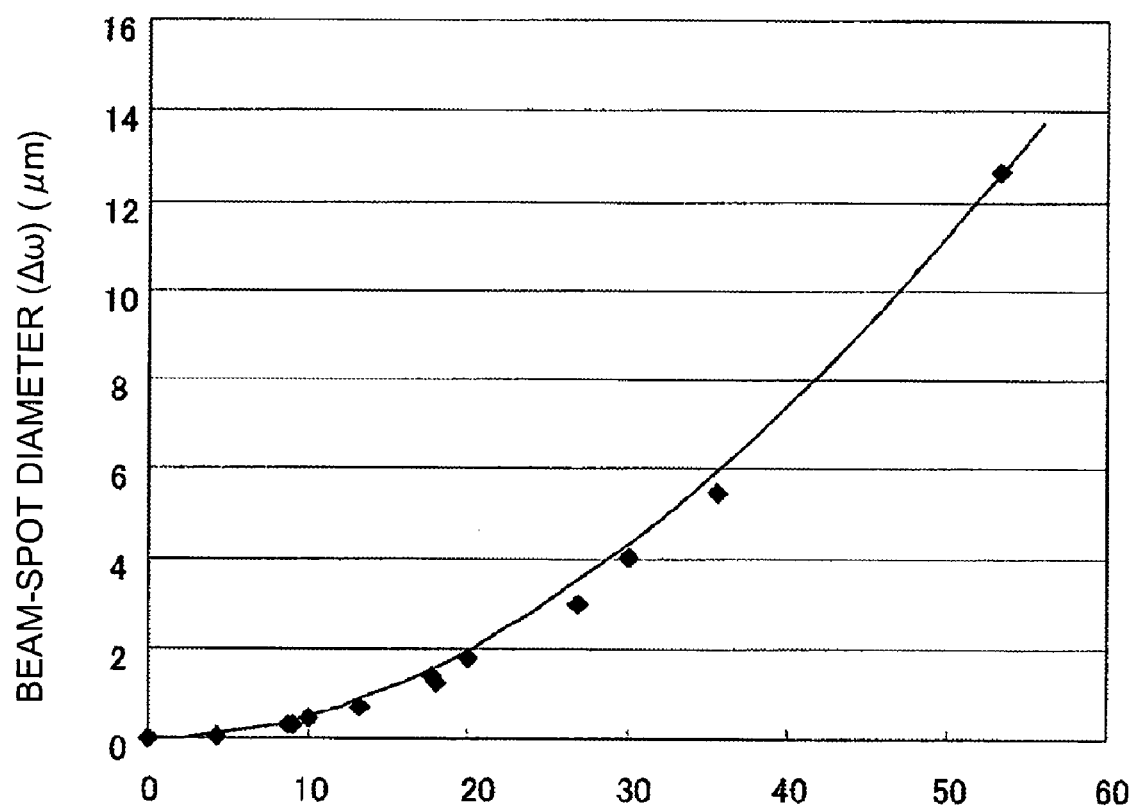
FIG. 17 is a graph plotting differences in beam-spot diameter when defocus is zero.

FIG. 17 depicts a curve plotted by obtaining a difference between the beam-spot diameter when (β×A)=0 at zero defocus (i.e., diameter of light-emitting area A=0) and the beam-spot diameter when (β×A)>0, from FIGS. 9A and 9B to FIGS. 16A and 16B. The curve is expressed by the following expression (5):

$$\Delta\omega = \omega - \omega0 = \omega0\left\{\sqrt{1 + \frac{1}{2}\left(\frac{\beta A}{\omega 0}\right)^2} - 1\right\} \quad (5)$$

where ω0 is a beam-spot diameter when the diameter of the light-emitting area A=0.

It is assumed that a relationship between the beam-spot diameter ω0 and a beam-spot diameter when the diameter of the light-emitting area A≠0 is expressed by the following expression (6):

$$\omega = \sqrt{\omega 0^2 + \frac{1}{2}(\beta A)^2} \quad (6)$$

where ω is a beam-spot diameter when the diameter of the light-emitting area A≠0.

It is clear from FIG. 17 that the increase of the beam-spot diameter in an actual writing optical system matches with the assumption.

An increasing rate δ of the beam-spot diameter occurring due to an increased diameter of the light-emitting area A is expressed by the following expression (7):

$$\delta = \frac{\Delta\omega}{\omega 0} \quad (7)$$
$$= \sqrt{1 + \frac{1}{2}E^2} - 1$$

where E=βA/ω0.

In the second embodiment, as explained above, E=5.0× 4÷50=0.4 in the main scanning direction (lateral magnification in the main scanning direction β=about 5.0, diameter of the light-emitting area A=4 μm, and beam-spot diameter (ω0=50 when A=0 (see FIGS. 13A and 13B)). The increasing rate δ in this case is suppressed to about 4% from the expression (7), and the beam-spot diameter ωm in the main scanning direction is 52 μm, that is, the beam-spot diameter ωm hardly changes. In the sub-scanning direction, E=0.16, and therefore, the change becomes smaller. The change for ω0=55 μm hardly occurs, and the beam-spot diameter remains at 55 μm.

In the conventional example, because the lateral magnification β in the main scanning direction is 8.9 times, E=0.712 and ωm=56 μm, which means the increase more than 10%. If the diameter of the light-emitting area A is set to a large value, for example, A=7 μm, then the lateral magnification β=5 times. If the target beam-spot diameter ω0=50 μm, then the values are E=0.7 and ωm=56 μm, which are not desirable for high image quality. If E=0.65 (for example, β=5, A=6.5, and ω0=50), then ω=55 μm and the change is made only by about 10% and, thus, the degradation of image quality falls within an allowable range.

Therefore, at least E=βA/ω0<0.7 is desirable, and the relationship with an actual beam-spot diameter ω at this time is expressed by the following expression (8) based on the expression (7):

$$E = \left\{\left(\frac{\omega}{\beta A}\right)^2 - \frac{1}{2}\right\}^{-\frac{1}{2}} \quad (8)$$

Furthermore, the VCSEL has an output of only about 1 to 2 milliwatts (mW), and improvement of an optical output is the problem to be solved. For the improvement, it is known that a larger diameter of the light-emitting area A is more effective. Even if the diameter can be increased in an area where the beam is not oscillated in multimode and the optical output can be increased, if the beam-spot diameter cannot be reduced, then the improvement of the image quality cannot be achieved. As explained above, by setting the beam-spot diameter to satisfy the following expression (9):

$$\left\{\left(\frac{\omega}{\beta A}\right)^2 - \frac{1}{2}\right\}^{-\frac{1}{2}} < 0.7 \quad (9)$$

it is possible to reduce the beam-spot diameter while the VCSEL which is disadvantageous about the light amount is used as a light source.

Figure 18:
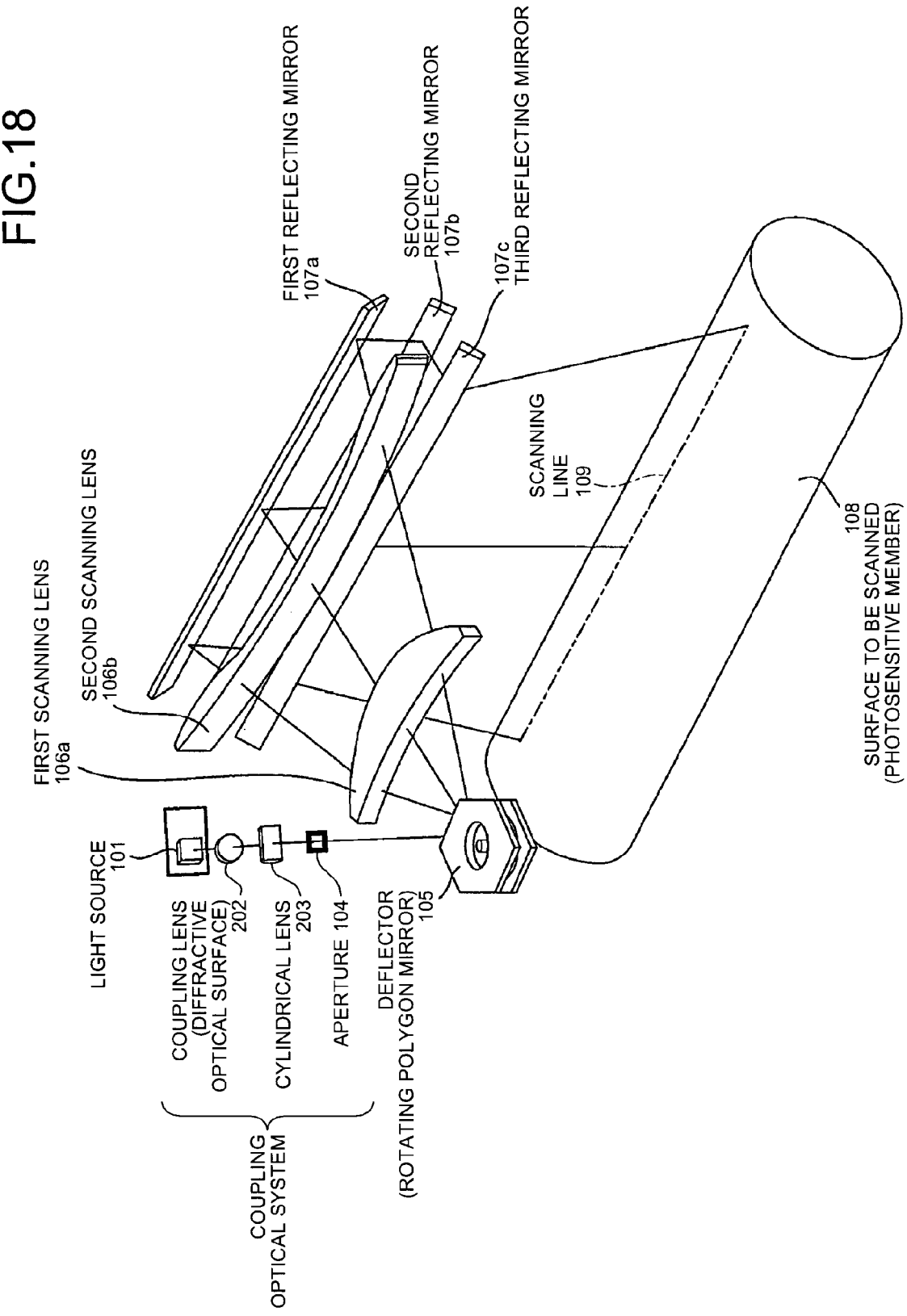
FIG. 18 is a schematic diagram of an optical system in an optical scanning device according to a third embodiment of the present invention.

FIG. 18 is a schematic diagram of an optical system in an optical scanning device according to a third embodiment of the present invention. In FIG. 18, like reference numerals refer to components corresponding to those according to the first embodiment explained in connection with FIG. 1.

A difference of the third embodiment from the first embodiment is that the diffractive optical surface is employed for a coupling lens 202. The diffraction structure subjected to the coupling lens 202 has a shape having a line-symmetric axis parallel to the main scanning direction and a line-symmetric axis parallel to the sub-scanning direction. As the shape, it is possible to provide, for example, a concentric diffraction grating in which the center line is used as an optical axis of the optical system or an elliptical diffraction grating which has a long axis or a short axis in the sub-scanning direction. More specifically, by providing the power of the diffractive optical surface in the main scanning direction and the sub-scanning direction, the beam waist positions of light beams in the both directions can be corrected by one optical element. Thus, the cost of the device can be reduced.

To correct the beam waist position with higher precision, the diffractive optical surface can also be provided on a cylindrical lens 203 in addition to the coupling lens 202.

Figure 19:
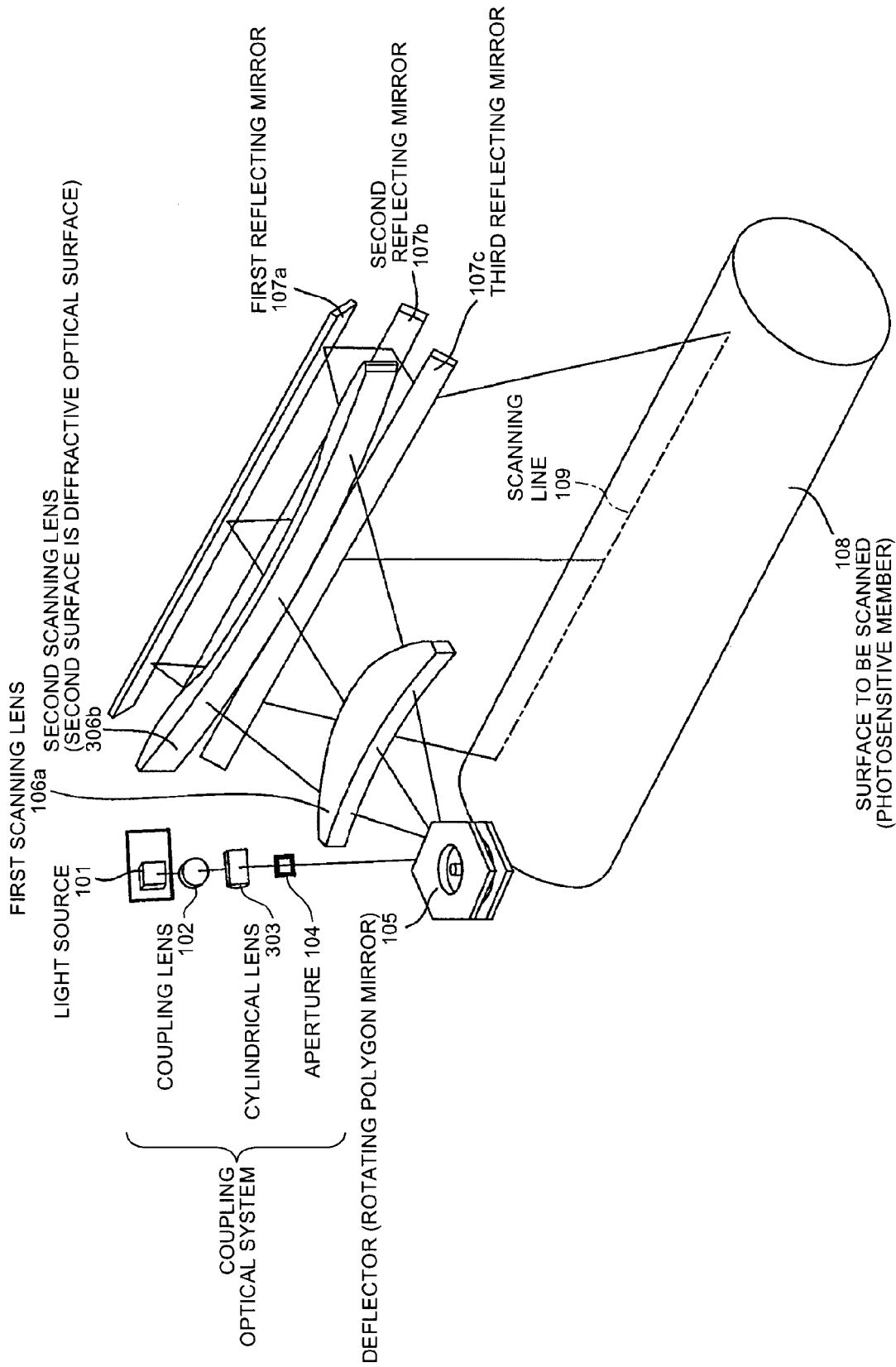
FIG. 19 is a schematic diagram of an optical system in an optical scanning device according to a fourth embodiment of the present invention.

FIG. 19 is a schematic diagram of an optical system in an optical scanning device according to a fourth embodiment of the present invention. In FIG. 19, like reference numerals refer to components corresponding to those according to the first embodiment explained in connection with FIG. 1.

As shown in FIG. 19, light beams emitted from the light source 101 are coupled by a coupling optical system that includes the coupling lens 102, a cylindrical lens 303, and the aperture 104. In the fourth embodiment, the light beams coupled and entering the deflector 105 are converted to parallel light flux in the main scanning direction, and forms an image near the deflection reflecting surface of the deflector in the sub-scanning direction, to form a liner image. The light flux deflected by the deflector 105 forms an image on the surface 108 to be scanned by a scanning optical system that includes the first scanning lens 106a and a second scanning lens 306b. In this case, the image is formed as the scanning line 109 on the cylindrical image carrier. The image carrier is made to rotate around its cylindrical axis to move the image plane in the direction perpendicular to the main scanning direction, and is optically scanned, and thus, the image is formed thereon.

In this case, the scanning optical system includes at least one diffractive optical surface having diffractive optical effect, and the temperature dependence $d\lambda/dT$ (nm/° C.) of wavelength of the light source 101 is set to satisfy the condition: $d\lambda/dT<0.15$ when linearly approximated. In the fourth embodiment, the diffractive optical surface is provided on the second scanning lens 306b which is closest to the surface 108 to be scanned, and an optical surface, of the second scanning lens 306b, which is closest to the surface 108 to be scanned is the diffractive optical surface.

The optical scanning device, in which the scanning optical system according to the fourth embodiment has two lenses, is generally configured to cause the second scanning lens 306b or a lens close to the surface 108 to be scanned to have much power in the sub-scanning direction. Provision of the diffractive optical surface on the second scanning lens 306b allows the lens to simultaneously have diffraction effect and refraction effect, which enables to effectively correct the shift of a focus position due to the change of the beam waist position. Moreover, because the lens is close to the surface 108 to be scanned, optical scanning can be performed without the influence of manufactural errors.

According to the first to fourth embodiments, the condition of the temperature dependence $d\lambda/dT$ of wavelength of the light source can be set as a range of $0.02<d\lambda/dT<0.08$. If the condition is set to a value lower than the lower limit of the condition, the condition for manufacture is restricted and the yield decreases, and the cost thereby undesirably increases. Moreover, the condition is set to the upper limit, the change in the light amount due to variation of the diffraction efficiency can further be reduced. By satisfying the condition, the diffraction efficiency can be more effectively prevented from its decrease, and the light source can be manufactured at low cost.

In the first to fourth embodiments, such a light source can be used that has properties, for example, oscillation central wavelength: 780 nm, size of light-emitting area: 4 μm×4 μm (main scanning direction×sub-scanning direction), optical output: 1 mW, radiation angle: 15°, temperature dependence $d\lambda/dT$ of wavelength: 0.062 (nm/° C.), and deflection direction: constant.

Moreover, by providing a plurality of light emitting points on the light source, it is also possible to perform high-speed and high-density writing by using a plurality of beams. The VCSEL can obtain a plurality of light emitting elements at one time through its manufacture by using the manufacturing method. Therefore, the light emitting points can be easily formed as one light source element, which enables the light source element to be incorporated in one light source unit at low cost even if it has the light emitting points. Thus, the device can be minimized and high-speed and high-density optical writing can also be performed.

FIG. 20 is a schematic diagram of an image forming apparatus using the optical scanning device according to any one of the above embodiments.

In the image forming apparatus, photoconductive and photosensitive members 402a to 402d rotate in the clockwise at substantially constant speed as indicated by respective arrows in FIG. 20. Although the image forming apparatus includes the four photosensitive members 402a to 402d to form a full color image, the respective configurations are the same as one another except for color toners to be used. Therefore, the components related to each of the photosensitive members are indicated by reference numerals without signs provided at the end thereof.

A charging unit 405 uniformly charges the surface of a photosensitive member 402, and an optical scanning device 401 exposes and scans the photosensitive member 402. The exposure causes an electrostatic latent image to be written on the photosensitive member 402, and a developing unit 403 visualizes the electrostatic latent image as a toner image. A transfer unit 406 transfers the toner image to an intermediate transfer belt 408 so that toner images visualized on the photosensitive members 402 are sequentially transferred to the intermediate transfer belt 408 and are superposed on top of one another as one image, to form a full color image. The full color image is transferred to a sheet S as a recording medium by another transfer unit 409, and the full color image on the sheet S is fixed by a fixing unit 407 to complete image formation, and the image is ejected to the outside.

A cleaning unit 404 removes residual toner which has not been transferred and paper dust from the photosensitive member 402. After these processes, the photosensitive member 402 is charged again by the charging unit 405.

By using the optical scanning device for the optical scanning device 401 in the image forming apparatus, satisfactory image formation can be performed without causing lack of light amount even due to temperature variation.

When the VCSEL is used for the optical scanning device, the light amount is smaller as compared with that of the edge-emitting type laser which is generally more widely used, although the VCSEL which is a light source with small temperature dependence of wavelength is quite suitable to form an optical scanning device together with an element having the diffractive optical surface.

To solve the lack of the light source, it is better to be set so that the temperature dependence $d\lambda/dT$ of wavelength is set to be small and reduction of the light amount due to temperature is suppressed. It is also better to be set to satisfy the following condition:

$$\pi(Dm \times Ds)/(4 \times S) > P0/Peff$$

where Dm is diameter of a light spot on the surface to be scanned in the main scanning direction, Ds is diameter of a light spot on the surface to be scanned in the sub-scanning direction, S is area of a pixel to be written as the minimum unit, P0 is exposure energy required for photosensitive medium, and Peff is exposure energy when one light flux used for scanning reaches the surface to be scanned.

Figure 21A:
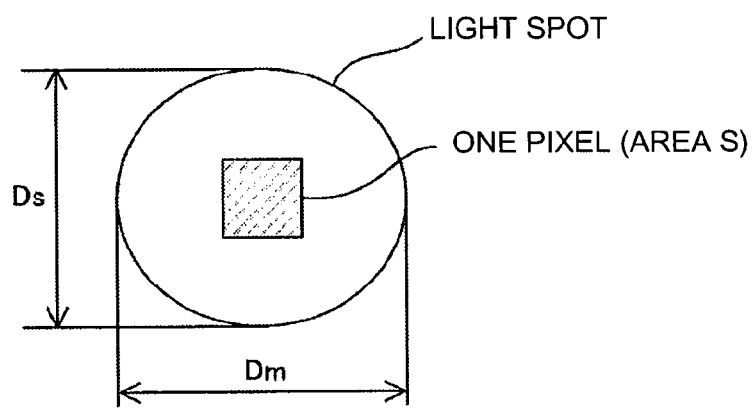
FIGS. 21A to 21C are schematic diagrams for explaining a relationship between a pixel and one or more light spots.
Figure 21B:
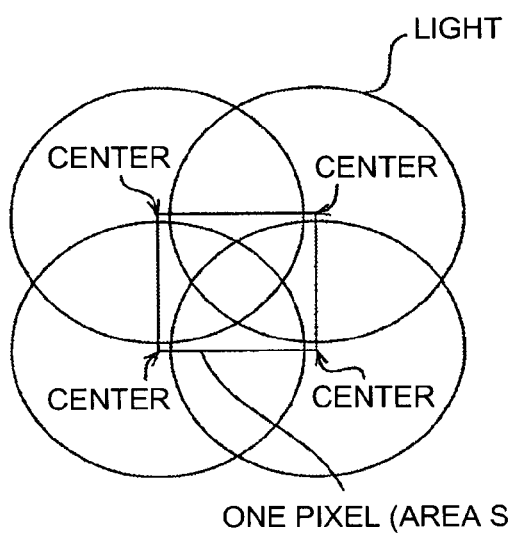
Figure 21C:
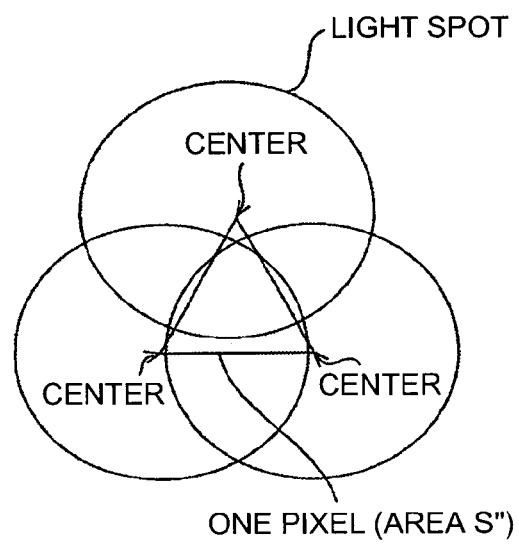

As shown in FIG. 21A, "$\pi(Dm \times Ds)/(4 \times S)$" indicates an area ratio between one pixel and the light spot. If this value is 2, then the light spot has an area twice that of the pixel. The pixel is usually used as the minimum unit of a point used for image formation. In this case, however, the pixel indicates an area surrounded by respective centers of adjacent light spots that form a light spot group (see FIGS. 21B and 21C).

Therefore, if setting is made in such a manner that one point is formed by using eight light spots for image processing, the point includes eight pixels each at the center of the light spot (see FIG. 21A). More specifically, the condition that should be defined herein is a relationship between a light amount of light spot, how light spots overlap, and exposure energy on the photosensitive member. For this reason, the pixel is not limited to one unit on an image. Furthermore, even if the shape of the pixel is a rectangle, triangle, or any other shape, the effect of the present invention can be obtained.

In the fifth embodiment, the area of the pixel is such that area $S=448$ μm$^2$, $P0=5$ mJ/m$^2$, $Peff=0.9$ mJ/m$^2$ when writing density is 1200 dpi in both the main scanning direction and the sub-scanning direction, where Peff is energy when the light beam emitted from the light source passes through the coupling optical system, the deflector, the scanning optical system, and the reflecting mirrors to reach the surface to be scanned (photosensitive member), and is affected by each optical use efficiency of each optical element. Because this energy is exposure energy per unit time, it is also affected by printing speed and scanning speed.

At this time, from the condition: $\pi(Dm \times Ds)/(4 \times S) > P0/Peff$, the product of the light spot diameters in the main scanning direction and in the sub-scanning direction is $Dm \times Ds > 3169$, or more than 3169. Because $\sqrt{3169} \sim 56.3$ in both the main scanning direction and in the sub-scanning direction, mutual products are set to be 3169 or more by combining values around 56 μm, and the products are thereby appropriate for the condition. Furthermore, in the present writing optical system, the depth of the beam-spot diameter in the sub-scanning direction is increased, and the variation thereby easily increases. Because of this, the light spot in the sub-scanning direction is set to be larger than that in the main scanning direction and, thus, the product can be set to 55×60 μm. As combinations thereof, it can also be set as 50×65, 45×72, and 60×60.

If a diameter Dm of the light spot on the surface to be scanned in the main scanning direction is set as $Dm=55$ μm and a diameter Ds thereof in the sub-scanning direction is set as $Ds=60$ μm, then these values satisfy the condition (left side: 5.78, right side: 5.6). Thus, optical scanning can be performed without the lack of the light amount. Furthermore, by controlling the light amount so as not to obtain it more than necessary after the condition is satisfied, power requirements of the device can be reduced.

When a plurality of scanning lines is to be concurrently formed by one scanning using a plurality of beams, a relationship between an inverse number W (μm) of writing density in the sub-scanning direction of the image forming apparatus and a diameter D (μm) of a light spot formed by the optical scanning device is W<D, and scanning-line formation can be set so that any one of a plurality of scanning lines formed by N-th scanning is formed within an area where a plurality of scanning lines is formed by M-th scanning. It is noted that M and N are natural numbers mutually different from each other.

The effect of the configuration is as follows. When a plurality of scanning lines is to be concurrently optically scanned, there are two portions, a portion exposed to a plurality of light spots by only one scanning and a portion exposed thereto by two or more scanning, to cause a difference in density between the two by a phenomenon of reciprocity failure. The difference is recognized as uneven density and the problem on image degradation occurs. The reciprocity failure is a phenomenon that if an interval of exposure time increases when multiple exposure is performed in such a manner that light spots overlap on the photosensitive medium being the surface to be scanned, the surface potential on the portion where multiple exposure has been performed is not proportional to the total of light amounts.

If the multiple exposure is performed by only one scanning, the exposure is applied to the overlapping positions in very short time. On the other hand, if the exposure is applied to positions by a plurality of scanning operations, the exposure is performed at a time lag corresponding to the rotational speed of the deflector. When time is integrated, potentials on surfaces are different depending on the properties of photosensitive media even if the same exposure amount is applied, because the time interval when being exposed is different. Therefore, the phenomenon of reciprocity failure causing uneven density becomes a problem.

When the condition is W<D, the multiple exposure occurs and the light spots overlap. Based on the configuration in which the condition: $\pi(Dm \times Ds)/(4 \times S) > P0/Peff$ is satisfied, if this condition is $\pi(Dm \times Ds)/(4 \times S) < 1$, then the multiple exposure also occurs. At this time, by setting scanning-line formation to form any one of the plurality of scanning lines formed by the N-th scanning within the area where the plurality of scanning lines is formed by the M-th scanning, a so-called "interlacing scanning system" can be set. Therefore, the overlap of the light spots in the same scanning is eliminated or reduced, which enables exposed states of points on the photosensitive member to be close to each other. Thus, it is possible to perform satisfactory image formation by reducing uneven density.

As set forth hereinabove, according to an embodiment of the present invention, even if the temperature of a light source varies, the decrease of the light amount can be reduced. Thus, optical scanning can be performed with less degradation.

Moreover, it is possible to reduce the change of beam waist position in the sub-scanning direction, and reduce the diffraction power of a diffractive optical surface in the sub-scanning direction. Thus, the diffractive optical surface is less affected by a manufactural error. Besides, the diffraction power can be provided in the main scanning direction and the sub-scanning direction, and the change of beam waist position can be corrected in the main scanning direction and the sub-scanning direction.

Furthermore, diffraction efficiency can be prevented from lowering, and thus an optical scanning device can be manufactured at low cost without decrease in yield. Even with a vertical cavity surface-emitting laser, which is disadvantageous about the light amount, the beam-spot diameter can be reduced. Thus, high-speed and high-density optical scanning can be performed.

Moreover, the light amount of the light source can be set appropriately, which results in less power consumption. In addition, by reducing uneven density due to reciprocity failure, excellent image formation can be achieved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
a light source configured to emit light beams;
a deflector configured to deflect the light beams in a main scanning direction;
a coupling optical system configured to guide the light beams from the light source to the deflector; and
a scanning optical system configured to scan the light beams on a target surface to form an image, wherein
the coupling optical system includes at least one diffractive optical surface, and
when linearly approximated, a temperature dependence $d\lambda/dT$ of a wavelength of the light source satisfies $d\lambda/dT < 0.15$, wherein
an optical system including both the coupling optical system and the scanning optical system satisfies $|\beta s| < |\beta m|$, where $\beta s$ is a lateral magnification in a sub-scanning direction perpendicular to the main scanning direction and $\beta m$ is a lateral magnification in the main scanning, direction.

2. The optical scanning device according to claim 1, wherein the diffractive optical surface collects the light beams only in the sub-scanning direction perpendicular to the main scanning direction.

3. The optical scanning device according to claim 1, wherein the temperature dependence satisfies $d\lambda/dT<0.15$ within a temperature range of ±20° C. of a design temperature of the light source.

4. The optical scanning device according to claim 1, wherein the diffractive optical surface has a line-symmetric axis parallel to the main scanning direction and a line-symmetric axis parallel to the sub-scanning direction perpendicular to the main scanning direction.

5. The optical scanning device according to claim 1, wherein, when linearly approximated, the temperature dependence $d\lambda/dT$ of the wavelength of the light source satisfies $0.02<d\lambda/dT<0.08$.

6. The optical scanning device according to claim 1, wherein an optical element having the at least one diffractive optical surface is a resin optical element.

7. The optical scanning device according to claim 1, wherein the light source is a vertical cavity surface-emitting laser.

8. The optical scanning device according to claim 1, wherein
the light source is a vertical cavity surface-emitting laser, and
in at least one of the main scanning direction and the sub-scanning direction perpendicular to the main scanning direction, a light emitting point of the light source satisfies:

$$\left\{\left(\frac{\omega}{\beta A}\right)^2 - \frac{1}{2}\right\}^{-\frac{1}{2}} < 0.7$$

where A is a diameter of a light-emitting area, β is a lateral magnification of an optical system of the optical scanning device, and ω is a beam-spot diameter.

9. The optical scanning device according to claim 1, wherein the light source has a plurality of light emitting points.

10. An optical scanning device, comprising:
a light source configured to emit light beams;
a deflector configured to deflect the light beams in a main scanning direction;
a coupling optical system configured to guide the light beams from the light source to the deflector; and
a scanning optical system configured to scan the light beams on a target surface to form an image, wherein
the scanning optical system includes at least one diffractive optical surface, and
when linearly approximated, a temperature dependence $d\lambda/dT$ of a wavelength of the light source satisfies $d\lambda/dT<0.15$, wherein
in at least one of the main scanning direction and a sub-scanning direction perpendicular to the main scanning direction, a light emitting point of the light source satisfies:

$$\left\{\left(\frac{\omega}{\beta A}\right)^2 - \frac{1}{2}\right\}^{-\frac{1}{2}} < 0.7$$

where A is a diameter of a light-emitting area, β is a lateral magnification of an optical system of the optical scanning device, and ω is a beam-spot diameter.

11. The optical scanning device according to claim 10, wherein, among optical elements of the scanning optical system, an optical element that is closest to the target surface has the at least one diffractive optical surface.

12. The optical scanning device according to claim 10, wherein, when linearly approximated, the temperature dependence $d\lambda/dT$ of the wavelength of the light source satisfies $0.02<d\lambda/dT<0.08$.

13. The optical scanning device according to claim 10, wherein an optical element having the at least one diffractive optical surface is a resin optical element.

14. The optical scanning device according to claim 10, wherein the light source is a vertical cavity surface-emitting laser.

15. The optical scanning device according to claim 10, wherein the light source is a vertical cavity surface-emitting laser.

16. The optical scanning device according to claim 10, wherein the light source has a plurality of light emitting points.

17. An image forming apparatus, comprising:
an optical scanning device that includes,
a light source configured to emit light beams;
a deflector configured to deflect the light beams in a main scanning direction;
a coupling optical system configured to guide the light beams from the light source to the deflector;
a scanning optical system configured to scan the light beams on a target surface to form an image; and
a photosensitive medium including the target surface, the target surface satisfying $\pi(Dm \times Ds)/(4 \times S) > P0/Peff$, where Dm is a diameter of a light spot on the target surface in the main scanning direction, Ds is a diameter of the light spot on the target surface in a sub-scanning direction, S is an area of a pixel to be written as a minimum unit, P0 is a required exposure energy of the photosensitive medium, and Peff is an exposure energy when one of the light beams reaches the target surface, wherein
one of the coupling optical system and the scanning optical system includes at least one diffractive optical surface, and
when linearly approximated, a temperature dependence $d\lambda/dT$ of a wavelength of the light source satisfies $d\lambda/dT<0.15$.

18. The image forming apparatus according to claim 17, wherein
the optical scanning device forms a plurality of scanning lines by one scanning,
a relation between an inverse number W of a writing density in a sub-scanning direction and a diameter D of a light spot formed by the optical scanning device satisfies W<D, and
one of a plurality of scanning lines formed by N-th scanning is formed in an area where a plurality of scanning lines is formed by M-th scanning, M and N each being a different natural number.

* * * * *